(12) United States Patent
Lim et al.

(10) Patent No.: US 10,959,182 B2
(45) Date of Patent: *Mar. 23, 2021

(54) METHOD FOR DETERMINING TRANSMISSION POWER FOR UPLINK SIGNAL AND A USER EQUIPMENT PERFORMING THE METHOD

(71) Applicant: LG Electronics Inc., Seoul (KR)

(72) Inventors: Suhwan Lim, Seoul (KR); Yoonoh Yang, Seoul (KR); Sangwook Lee, Seoul (KR); Manyoung Jung, Seoul (KR); Jinyup Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/714,442

(22) Filed: Dec. 13, 2019

(65) Prior Publication Data

US 2020/0120611 A1 Apr. 16, 2020

Related U.S. Application Data

(63) Continuation of application No. 16/149,554, filed on Oct. 2, 2018, now Pat. No. 10,531,397.

(Continued)

(51) Int. Cl.
*H04W 52/14* (2009.01)
*H04W 72/04* (2009.01)
(Continued)

(52) U.S. Cl.
CPC ......... *H04W 52/146* (2013.01); *H04W 52/34* (2013.01); *H04W 52/346* (2013.01);
(Continued)

(58) Field of Classification Search
CPC .......................... H04W 52/146; H04W 52/34
(Continued)

(56) References Cited

U.S. PATENT DOCUMENTS

2015/0334663 A1* 11/2015 Ueda ................. H04W 72/0473
370/252
2017/0086149 A1* 3/2017 Takeda ................. H04W 52/365
(Continued)

OTHER PUBLICATIONS

3rd Generation Partnership Project, "Technical Specification Group Radio Access Network; Evolved Universal Terrestrial Radio Access (E-UTRA)," 3GPP TS 36.211, dated Dec. 2011, 101 pages.

*Primary Examiner* — John J Lee
(74) *Attorney, Agent, or Firm* — Fish & Richardson P.C.

(57) ABSTRACT

There is provided a method for determining transmission power for uplink signal, the method performed by a user equipment (UE) and comprising: determining a total transmission power for E-UTRA uplink signal and NR uplink signal, when the E-UTRA uplink signal and the NR uplink signal overlap in time, wherein the total transmission power satisfies a condition including on $P_{CMAX\_L}$ and $P_{CMAX\_H}$, wherein $P_{CMAX\_L}$ is a lower limit for the total transmission power and $P_{CMAX\_H}$ is a higher limit for the total transmission power, wherein when the E-UTRA uplink signal is transmitted on a scheduling unit p, when the NR uplink signal is transmitted on a scheduling unit q, the scheduling unit p is taken as a reference for the determination; and transmitting the E-UTRA uplink signal and the NR uplink signal based on the determined total transmission power.

14 Claims, 18 Drawing Sheets

Related U.S. Application Data

(60) Provisional application No. 62/615,969, filed on Jan. 11, 2018, provisional application No. 62/587,506, filed on Nov. 17, 2017, provisional application No. 62/566,571, filed on Oct. 2, 2017.

(51) Int. Cl.
*H04W 72/12* (2009.01)
*H04W 52/34* (2009.01)
*H04W 52/36* (2009.01)

(52) U.S. Cl.
CPC ....... *H04W 52/367* (2013.01); *H04W 72/044* (2013.01); *H04W 72/12* (2013.01)

(58) Field of Classification Search
USPC ................. 455/522, 69, 422.1, 452.1, 67.11; 370/352
See application file for complete search history.

(56) References Cited

U.S. PATENT DOCUMENTS

2018/0279226 A1* 9/2018 Lim ...................... H04W 52/36
2018/0359711 A1* 12/2018 Akkarakaran ...... H04W 52/267

* cited by examiner

FIG. 4
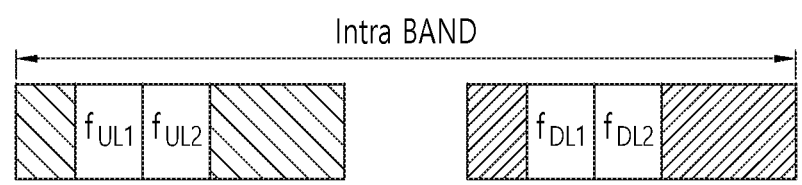
(a)
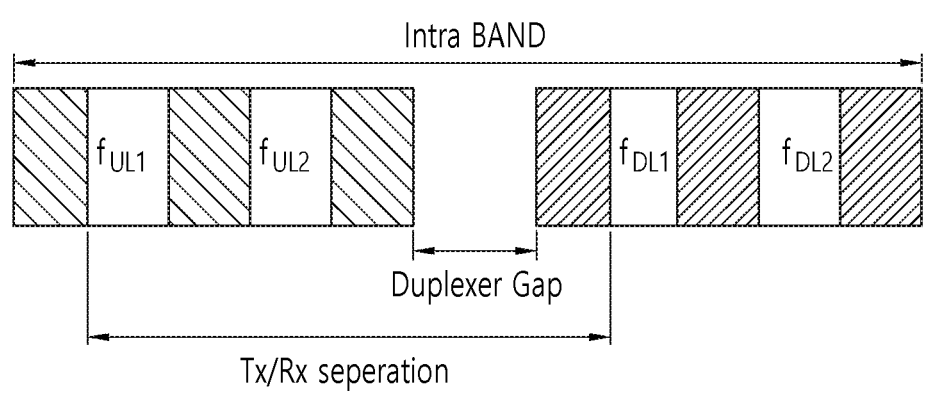
(b)

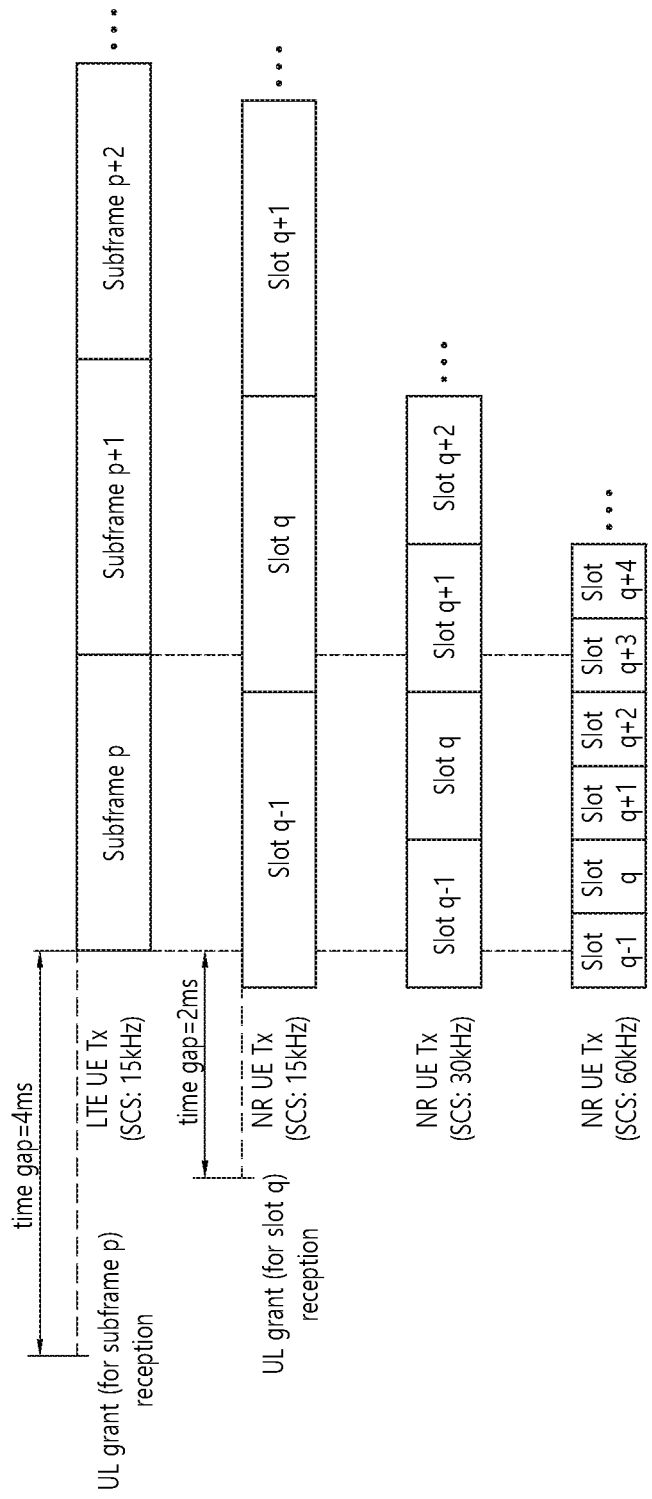

METHOD FOR DETERMINING TRANSMISSION POWER FOR UPLINK SIGNAL AND A USER EQUIPMENT PERFORMING THE METHOD

CROSS-REFERENCE TO RELATED APPLICATIONS

Pursuant to 35 U.S.C. § 119 (e), this application is a continuation of U.S. application Ser. No. 16/149,554, filed on Oct. 2, 2018, which claims the benefit of U.S. Provisional Applications No. 62/566,571, filed on Oct. 2, 2017, No. 62/587,506, filed on Nov. 17, 2017, and 62/615,969, filed on Jan. 11, 2018, the contents of which are all hereby incorporated by reference herein in their entirety.

BACKGROUND OF THE INVENTION

Field of the Invention

The present invention relates to mobile communication.

Discussion of the Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

With the success of long term evolution (LTE)/LTE-A (LTE-Advanced) for the 4th generation mobile communication, more interest is rising to the next generation, i.e., 5th generation (also known as 5G) mobile communication and extensive research and development are being carried out accordingly.

According to the International Telecommunication Union (ITU), the fifth generation (5G) mobile communication is defined as a mobile communication technology that provides a maximum data transmission rate of 20 Gbps and a minimum experienced data rate of 100 Mbps or more in any location. The official term is 'IMT-2020', which aims worldwide commercial usage by the year of 2020.

The ITU proposes three major usage scenarios, such as an enhanced Mobile BroadBand (eMBB), a massive Machine Type Communication (mMTC), and an Ultra Reliable and Low Latency Communications (URLLC).

The URLLC relates to a usage scenario requiring high reliability and a low latency time (or delay time). For example, services such as automated driving, factory automation, augmented reality (AR), and so on, require high reliability and a low latency time (e.g., a latency time of 1 ms or less). Statistically, the latency time of the current 4G (LTE) is within the range of 21-43 ms (best 10%) and 33-75 ms (median). This is insufficient for supporting a service that requires a latency time of 1 ms or less. The following eMBB usage scenario corresponds to a usage scenario that requires a mobile ultra-wide band.

More specifically, the 5th generation mobile communication system aims to achieve a capacity that is greater than the current 4G LTE. The 5G mobile communication system is also capable of increasing user density for mobile wideband users and supporting Device to Device (') communication, high stability, and Machine Type Communication (MTC). The 5G research and development also aims to achieve a lower latency time and lower battery power consumption as compared to the 4G mobile communication system in order to successfully implement the Internet of Things (IoT). For such 5G mobile communication, a new radio access technology (New RAT or NR) may be proposed.

In the NR, it may be considered to use a downlink (DL) subframe for the reception from the base station and to use an uplink (UL) subframe for a transmission to the base station. This may be applied to a spectrum that is formed in pairs and to a spectrum that is not formed in pairs. A spectrum pair means that two carrier spectrums are included for the downlink and uplink operations. For example, in a spectrum pair, one carrier may include a downlink band and an uplink band that is paired with the downlink band.

In the NR, a user equipment (UE) may perform NR non-standalone (NSA) operation mode with Evolved Universal Terrestrial Radio Access (E-UTRA), which is included in the 3GPP LTE. The NSA operation mode is a mode of operation that NR communication is assisted with E-UTRA communication or operation of E-UTRA communication is assisted with NR communication. The UE can perform E-UTRA-NR Dual Connectivity (EN-DC) operation which allows the UE to exchange data between itself and NR base station along with simultaneous connection with E-UTRA (or LTE) base station. When the UE in NSA operation mode performs EN-DC operation with E-UTRA, the UE may transmit both E-UTRA uplink signal and NR uplink signal simultaneously. When the E-UTRA uplink signal and the NR uplink signal are transmitted simultaneously, the total transmission power configured for both E-UTRA uplink signal and NR uplink signal overlap in time may exceed power class, which is a total maximum output power for any transmission bandwidth. Thus, when the UE determines total transmission power, there is a need to consider both the E-UTRA uplink signal and the NR uplink signal which overlap in time to prevent uplink transmission exceeding maximum permissible exposure (MPE) or specific absorption rate (SAR).

Further, there are differences between uplink scheduling for E-UTRA and uplink scheduling for NR. For example, in E-UTRA, time gap between uplink grant and subframe allocated by the uplink grant is fixed as 4 ms and time duration of each subframe are same. In NR, time gap between uplink grant and subframe allocated by the uplink grant is flexible and length of each subframe varies based on sub carrier spacing for NR uplink signal. Due to the differences, time gap between scheduling units of E-UTRA and scheduling units of NR which overlaps in time may vary and number of scheduling unit of NR which overlaps with scheduling units of E-UTRA may vary. Thus, there is a need to take a reference for determining total transmission power based on a consideration of both the E-UTRA uplink signal and the NR uplink signal which overlap in time.

SUMMARY OF THE INVENTION

Accordingly, a disclosure of the present specification has been made in an effort to solve the aforementioned problem.

In order to achieve the above-described technical object of the present invention, a disclosure of this specification provides is a method for determining transmission power for uplink signal, the method performed by a user equipment (UE) and comprising: determining a total transmission power for Evolved Universal Terrestrial Radio Access (E-UTRA) uplink signal and New Radio access (NR) uplink signal, when the E-UTRA uplink signal and the NR uplink signal overlap in time, wherein the total transmission power satisfies a condition including on $P_{CMAX\_L}$ and $P_{CMAX\_H}$, wherein $P_{CMAX\_L}$ is a lower limit for the total transmission power and $P_{CMAX\_H}$ is a higher limit for the total transmission power, wherein when the E-UTRA uplink signal is transmitted on a scheduling unit p, when the NR uplink signal is transmitted on a scheduling unit q, the scheduling unit p is taken as a reference for the determination, wherein the $P_{CMAX\_L}$ is determined based on scheduling unit pairs which include a scheduling pair (p,q), a scheduling pair (p,q+1), up to a scheduling pair (p,q+n), wherein the $P_{CMAX\_H}$ is determined based on scheduling unit pairs which include a scheduling pair (p,q), a scheduling pair (p,q+1), up to a scheduling pair (p,q+n), and wherein q+n is related with a last scheduling unit q+n of the NR uplink signal which overlaps with the scheduling unit p of the E-UTRA uplink signal; and transmitting the E-UTRA uplink signal and the NR uplink signal based on the determined total transmission power.

The $P_{CMAX\_L}$ is determined based on lower limits for transmission power of each of the scheduling unit pairs which include the scheduling pair (p,q), the scheduling pair (p,q+1), up to the scheduling pair (p,q+n), and the $P_{CMAX\_H}$ is determined based on higher limits for transmission power of each of the scheduling unit pairs which include the scheduling pair (p,q), the scheduling pair (p,q+1), up to the scheduling pair (p,q+n).

The $P_{CMAX\_L}$ is determined based on a following equation: MIN {$P_{CMAX\_L}$ (p,q), $P_{CMAX\_L}$ (p,q+1), ..., $P_{CMAX\_L}$ (p,q+n)}, the $P_{CMAX\_H}$ is determined based on a following equation: MAX {$P_{CMAX\_H}$ (p,q), $P_{CMAX\_H}$ (p,q+1), ..., $P_{CMAX\_H}$ (p,q+n)}, the $P_{CMAX\_L}$ (p,q) is a lower limit for transmission power of the scheduling unit pair (p,q), and the $P_{CMAX\_H}$ (p,q) is a higher limit for transmission power of the scheduling unit pair (p,q).

The $P_{CMAX\_L}$ (p,q) is determined based on a lower limit for transmission power of the E-UTRA uplink signal transmitted on the scheduling unit p, a lower limit for transmission power of the NR uplink signal transmitted on the scheduling unit q, and a maximum transmission power of the UE, and the $P_{CMAX\_H}$ (p,q) is determined based on a higher limit for transmission power of the E-UTRA uplink signal transmitted on the scheduling unit p, a higher limit for transmission power of the NR uplink signal transmitted on the scheduling unit q, and a maximum transmission power of the UE.

The E-UTRA uplink signal is transmitted to E-UTRA serving cell, and the NR uplink signal is transmitted to NR serving cell.

The total transmission power is determined to satisfy $P_{CMAX\_L} - T_{LOW}(P_{CMAX\_L}) \le$ the total transmission power $\_ P_{CMAX\_H} + T_{HIGH}(P_{CMAX\_H})$, the $T_{LOW}(P_{CMAX\_L})$ is a tolerance value which is determined based on $P_{CMAX\_L}$, and the $T_{HIGH}(P_{CMAX\_H})$ is a tolerance value which is determined based on $P_{CMAX\_H}$.

The $T_{LOW}(P_{CMAX\_L})$ and the $T_{HIGH}(P_{CMAX\_H})$ are determined based on a following table:

| the total transmission power $P_{CMAX}$ (dBm) | Tolerance $T_{LOW}(P_{CMAX\_L})$ (dB) | Tolerance $T_{HIGH}(P_{CMAX\_H})$ (dB) |
| --- | --- | --- |
| $P_{CMAX} = 23$ | 3.0 | 2.0 |
| $22 \le P_{CMAX} < 23$ | 5.0 | 2.0 |
| $21 \le P_{CMAX} < 22$ | 5.0 | 3.0 |
| $20 \le P_{CMAX} < 21$ | 6.0 | 4.0 |
| $16 \le P_{CMAX} < 20$ | | 5.0 |
| $11 \le P_{CMAX} < 16$ | | 6.0 |
| $-40 \le P_{CMAX} < 11$ | | 7.0 |

The scheduling unit p is subframe p of the E-UTRA uplink signal and the scheduling unit q is slot q of the NR uplink signal.

In order to achieve the above-described technical object of the present invention, a disclosure of this specification also provides a user equipment (UE) for determining transmission power for uplink signal, the UE comprising, a transceiver; and a processor operatively connected to the transceiver, the processor is configured to: determine a total transmission power for Evolved Universal Terrestrial Radio Access (E-UTRA) uplink signal and New Radio access (NR) uplink signal, when the E-UTRA uplink signal and the NR uplink signal overlap in time, wherein the total transmission power satisfies a condition including on $P_{CMAX\_L}$ and $P_{CMAX\_H}$, wherein $P_{CMAX\_L}$ is a lower limit for the total transmission power and $P_{CMAX\_H}$ is a higher limit for the total transmission power, wherein when the E-UTRA uplink signal is transmitted on a scheduling unit p, when the NR uplink signal is transmitted on a scheduling unit q, the scheduling unit p is taken as a reference for the determination, wherein the $P_{CMAX\_L}$ is determined based on scheduling unit pairs which include a scheduling pair (p,q), a scheduling pair (p,q+1), up to a scheduling pair (p,q+n), wherein the $P_{CMAX\_H}$ is determined based on scheduling unit pairs which include a scheduling pair (p,q), a scheduling pair (p,q+1), up to a scheduling pair (p,q+n), and wherein q+n is related with a last scheduling unit q+n of the NR uplink signal which overlaps with the scheduling unit p of the E-UTRA uplink signal; and control the transceiver to transmit the E-UTRA uplink signal and the NR uplink signal based on the determined total transmission power.

The $P_{CMAX\_L}$ is determined based on lower limits for transmission power of each of the scheduling unit pairs which include the scheduling pair (p,q), the scheduling pair (p,q+1), up to the scheduling pair (p,q+n), and the $P_{CMAX\_H}$ is determined based on higher limits for transmission power of each of the scheduling unit pairs which include the scheduling pair (p,q), the scheduling pair (p,q+1), up to the scheduling pair (p,q+n).

The $P_{CMAX\_L}$ is determined based on a following equation: MIN {$P_{CMAX\_L}$ (p,q), $P_{CMAX\_L}$ (p,q+1), ..., $P_{CMAX\_L}$ (p,q+n)}, the $P_{CMAX\_H}$ is determined based on a following equation: MAX {$P_{CMAX\_H}$ (p,q), $P_{CMAX\_H}$ (p,q+1), ..., $P_{CMAX\_H}$ (p,q+n)}, the $P_{CMAX\_L}$ (p,q) is a lower limit for transmission power of the scheduling unit pair (p,q), and the $P_{CMAX\_H}$ (p,q) is a higher limit for transmission power of the scheduling unit pair (p,q).

The $P_{CMAX\_L}$ (p,q) is determined based on a lower limit for transmission power of the E-UTRA uplink signal transmitted on the scheduling unit p, a lower limit for transmission power of the NR uplink signal transmitted on the scheduling unit q, and a maximum transmission power of the UE, and the $P_{CMAX\_H}$ (p,q) is determined based on a higher limit for transmission power of the E-UTRA uplink signal transmitted on the scheduling unit p, a higher limit for transmission power of the NR uplink signal transmitted on the scheduling unit q, and a maximum transmission power of the UE.

The E-UTRA uplink signal is transmitted to E-UTRA serving cell, and the NR uplink signal is transmitted to NR serving cell.

The total transmission power is determined to satisfy $P_{CMAX\_L} - T_{LOW}(P_{CMAX\_L}) \leq$ the total transmission power $\leq P_{CMAX\_H} + T_{HIGH}(P_{CMAX\_H})$, the $T_{LOW}(P_{CMAX\_L})$ is a tolerance value which is determined based on $P_{CMAX\_L}$, and the $T_{HIGH}(P_{CMAX\_H})$ is a tolerance value which is determined based on $P_{CMAX\_H}$.

The $T_{LOW}(P_{CMAX\_L})$ and the $T_{HIGH}(P_{CMAX\_H})$ are determined based on a following table:

| the total transmission power $P_{CMAX}$ (dBm) | Tolerance $T_{LOW}(P_{CMAX\_L})$ (dB) | Tolerance $T_{HIGH}(P_{CMAX\_H})$ (dB) |
|---|---|---|
| $P_{CMAX} = 23$ | 3.0 | 2.0 |
| $22 \leq P_{CMAX} < 23$ | 5.0 | 2.0 |
| $21 \leq P_{CMAX} < 22$ | 5.0 | 3.0 |
| $20 \leq P_{CMAX} < 21$ | 6.0 | 4.0 |
| $16 \leq P_{CMAX} < 20$ | | 5.0 |
| $11 \leq P_{CMAX} < 16$ | | 6.0 |
| $-40 \leq P_{CMAX} < 11$ | | 7.0 |

The scheduling unit p is subframe p of the E-UTRA uplink signal and the scheduling unit q is slot q of the NR uplink signal.

According to a disclosure of the present invention, the above problem of the related art is solved.

BRIEF DESCRIPTION OF THE DRAWINGS

FIG. 4 is a concept view illustrating intra-band carrier aggregation.

FIG. 12 illustrates an example of scheduling units of E-UTRA/NR Dual Connectivity operation when a reception of E-UTRA uplink grant is earlier.

DETAILED DESCRIPTION OF THE EMBODIMENTS

Figure 1:
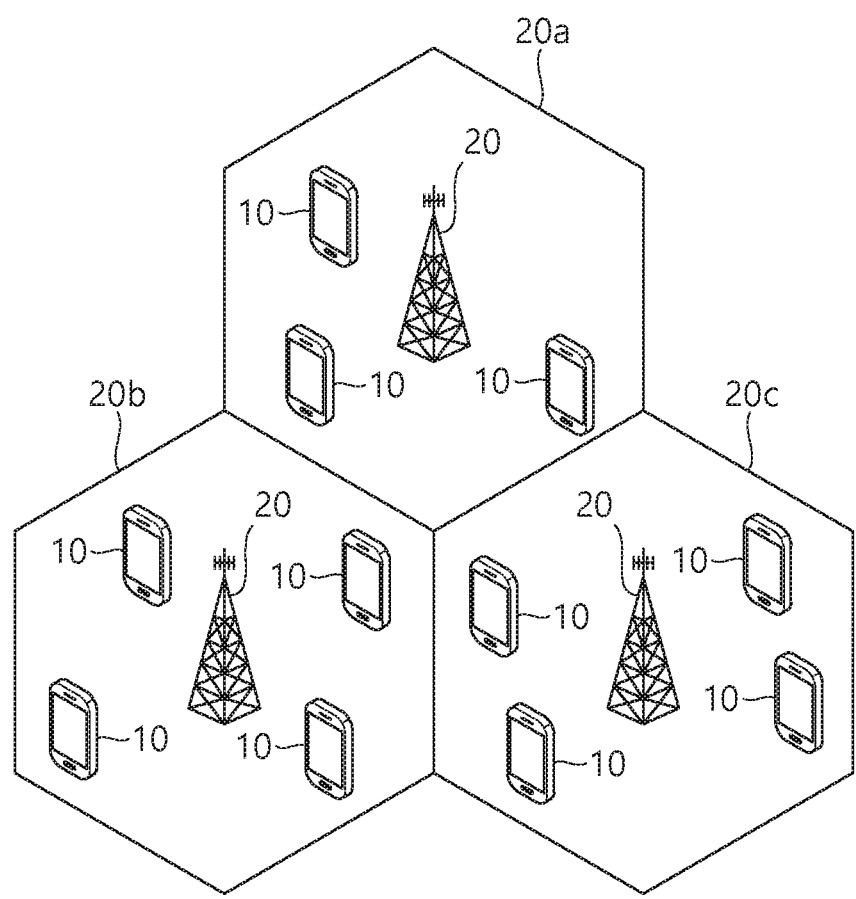
FIG. 1 illustrates a wireless communication system.

Hereinafter, based on 3rd Generation Partnership Project (3GPP) long term evolution (LTE) or 3GPP LTE-advanced (LTE-A), the present invention will be applied. Also, based on 3GPP 5G new radio access technology (New RAT or NR), the present invention will be applied. This is just an example, and the present invention may be applied to various wireless communication systems. Hereinafter, LTE includes LTE and/or LTE-A, NR includes 5G and/or 5G NR.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as evolved-NodeB (eNB), base transceiver system (BTS), or access point.

As used herein, 'user equipment (UE)' may be stationary or mobile, and may be denoted by other terms such as device, wireless device, terminal, mobile station (MS), user terminal (UT), subscriber station (SS), mobile terminal (MT), and so on.

FIG. 1 illustrates a wireless communication system.

As seen with reference to FIG. 1, the wireless communication system includes at least one base station (BS) (20). Each base station (20) provides a communication service to specific geographical areas (generally, referred to as cells) (20a, 20b, and 20c). The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station (20) to the UE (10) and an uplink means communication from the UE (10) to the base station (20). In the downlink, a transmitter may be a part of the base station (20) and a receiver may be a part of the UE (10). In the uplink, the transmitter may be a part of the UE (10) and the receiver may be a part of the base station (20).

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Figure 2:
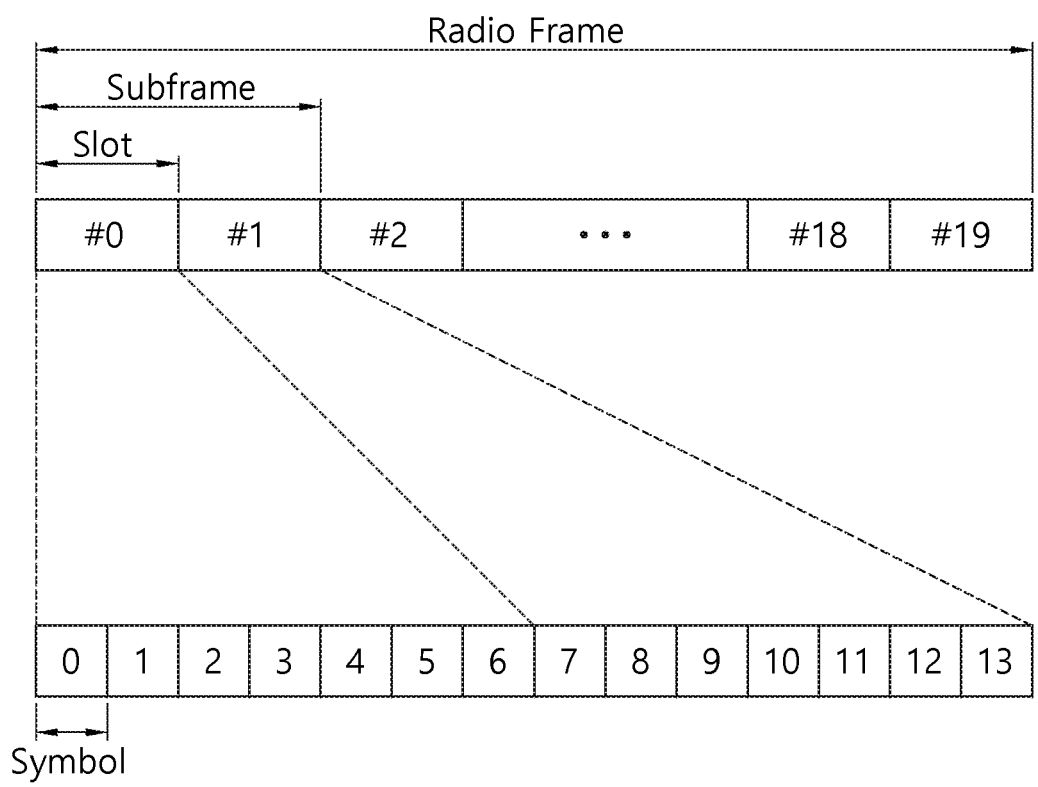
FIG. 2 illustrates the architecture of a radio frame according to FDD in 3GPP LTE.

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

One slot includes NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The uplink channels include a PUSCH, a PUCCH, an SRS (Sounding Reference Signal), and a PRACH (physical random access channel).

Figure 3:
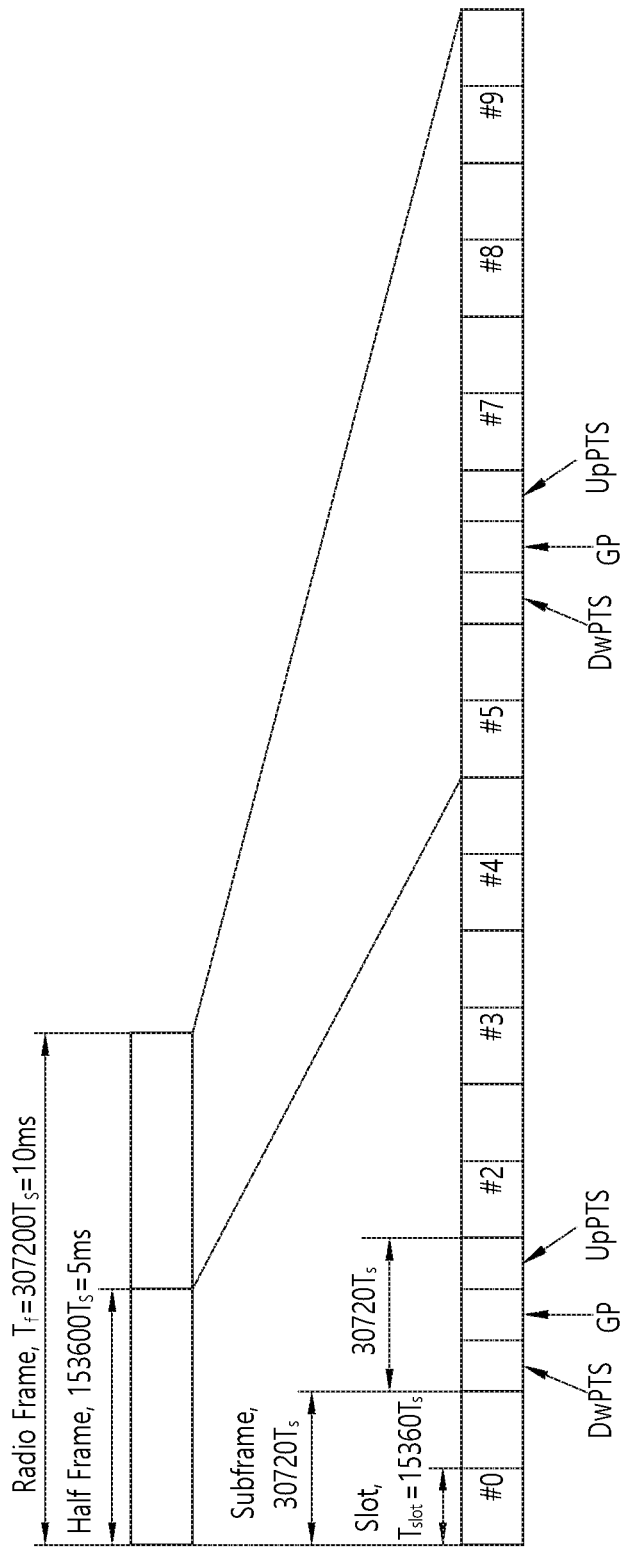
FIG. 3 illustrates the architecture of a downlink radio frame according to TDD in 3GPP LTE.

FIG. 3 illustrates the architecture of a downlink radio frame according to TDD in 3GPP LTE.

For this, 3GPP TS 36.211 V10.4.0 (2011-23) "Evolved Universal Terrestrial Radio Access (E-UTRA); Physical Channels and Modulation (Release 8)", Ch. 4 may be referenced, and this is for TDD (time division duplex).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |

TABLE 1-continued

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provide an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

FIG. 4 is a concept view illustrating intra-band carrier aggregation (CA).

FIG. 4(a) illustrates intra-band contiguous CA, and FIG. 4(b) illustrates intra-band non-contiguous CA.

LTE-advanced adds various schemes including uplink MIMO and carrier aggregation in order to realize high-speed wireless transmission. The CA that is being discussed in LTE-advanced may be split into the intra-band contiguous CA shown in FIG. 4(a) and the intra-band non-contiguous CA shown in FIG. 4(b).

Figure 5:
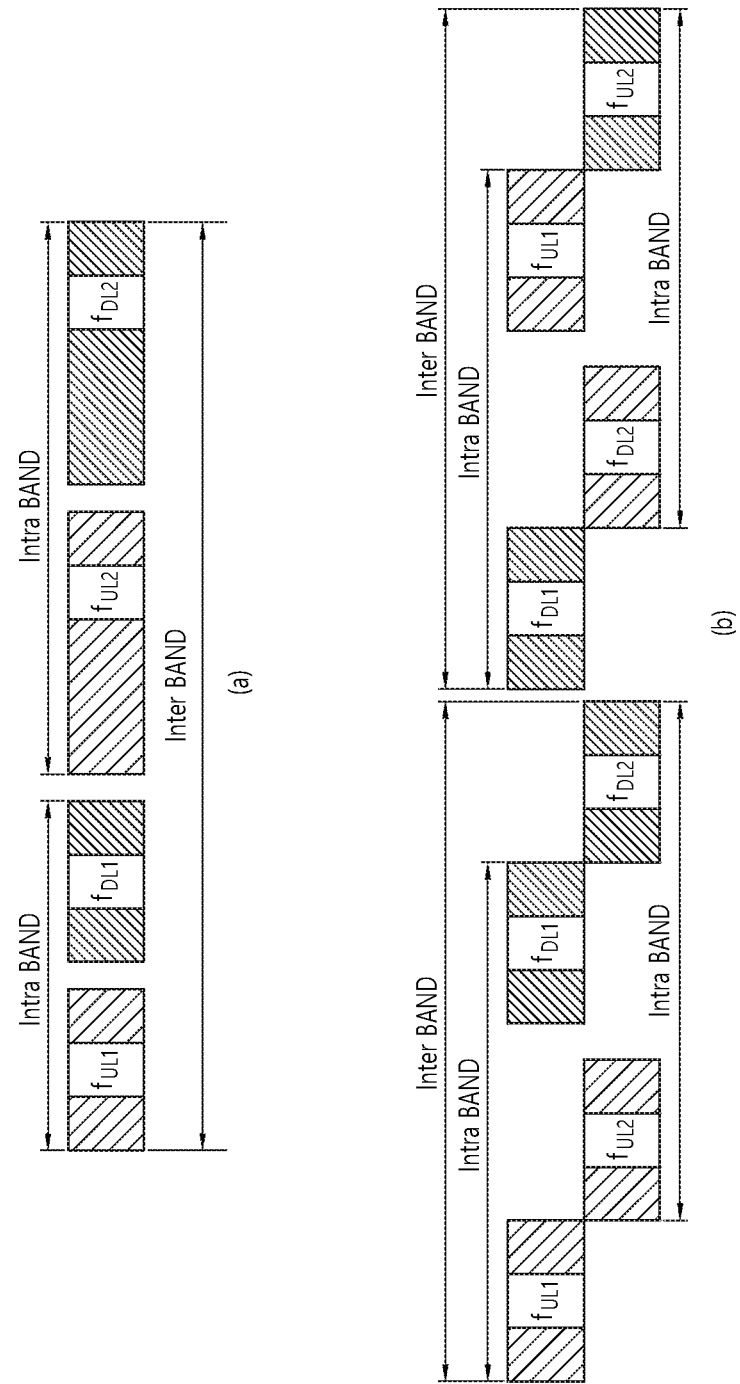
FIG. 5 is a concept view illustrating inter-band carrier aggregation.

FIG. 5 is a concept view illustrating inter-band carrier aggregation.

FIG. 5(a) illustrates a combination of a lower band and a higher band for inter-band CA, and FIG. 5(b) illustrates a combination of similar frequency bands for inter-band CA.

In other words, the inter-band carrier aggregation may be separated into inter-band CA between carriers of a low band and a high band having different RF characteristics of inter-band CA as shown in FIG. 5(a) and inter-band CA of similar frequencies that may use a common RF terminal per component carrier due to similar RF (radio frequency) characteristics as shown in FIG. 5(b).

TABLE 2

| Operating Band | Uplink (UL) operating band $F_{UL\_low}$-$F_{UL\_high}$ | Downlink (DL) operating band $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A N/A | 717 MHz-728 MHz | FDD |
| 30 | 2305 MHz-2315 MHz | 2350 MHz-2360 MHz | FDD |
| 31 | 452.5 MHz-457.5 MHz | 462.5 MHz-467.5 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz 2690 MHz | 2496 MHz 2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |

Meanwhile, the 3GPP LTE/LTE-A systems define operating bands for uplink and downlink as shown in Table 2 above. Four CA cases shown in FIG. 5 come from Table 2.

Here, $F_{UL\_low}$ means the lowest frequency in the uplink operating bands. $F_{UL\_high}$ means the highest frequency in the uplink operating bands. Further, $F_{DL\_low}$ means the lowest frequency in the downlink operating bands, and $F_{DL\_high}$ means the highest frequency in the downlink operating bands.

When the operating bands are defined as shown in Table 2, each nation's frequency distributing organization may assign specific frequencies to service providers in compliance with the nation's circumstances.

Meanwhile, CA bandwidth classes and their corresponding guard bands are as shown in the following table.

TABLE 3

| CA Bandwidth Class | Aggregated Transmission Bandwidth Configuration | Maximum number of CCs | Nominal Guard Band BWGB |
|---|---|---|---|
| A | $N_{RB,agg} \leq 100$ | 1 | $0.05BW_{Channel(1)}$ |
| B | $N_{RB,agg} \leq 100$ | 2 | FFS |
| C | $100 < N_{RB,agg} \leq 200$ | 2 | 0.05 max($BW_{Channel(1)}$, |

TABLE 3-continued

| CA Bandwidth Class | Aggregated Transmission Bandwidth Configuration | Maximum number of CCs | Nominal Guard Band BWGB |
|---|---|---|---|
| | | | $BW_{Channel(2)})$ |
| D | $200 < N_{RB,agg} \leq [300]$ | FFS | FFS |
| E | $[300] < N_{RB,agg} \leq [400]$ | FFS | FFS |
| F | $[400] < N_{RB,agg} \leq [500]$ | FFS | FFS |

In the above table, the brackets [ ] represent that the value therebetween is not completely determined and may be varied. FFS stands for 'For Further Study.' $N_{RB\_agg}$ is the number of RBs aggregated in an aggregation channel band.

Table 4 below shows bandwidth sets respective corresponding to CA configurations.

TABLE 4

E-UTRA CA configuration/Bandwidth combination Set

| E-UTRA CA configuration | 50 RB + 100 RB (10 MHz + 20 MHz) | 75 RB + 75 RB (15 MHz + 15 MHz) | 75 RB + 100 RB (15 MHz + 20 MHz) | 100 RB + 100 RB (20 MHz + 20 MHz) | Maximum aggregated bandwidth [MHz] | Bandwidth Combination Set |
|---|---|---|---|---|---|---|
| CA_1C | | Yes | | Yes | 40 | 0 |
| CA_7C | | Yes | | Yes | 40 | 0 |
| CA_38C | | Yes | | Yes | 40 | 0 |
| CA_40C | Yes | Yes | | Yes | 40 | 0 |
| CA_41C | Yes | Yes | Yes | Yes | 40 | 0 |

In the above table, CA configuration represents an operating bandwidth and CA bandwidth class. For example, CA_1C means operating band 2 in Table 2 and CA band class C in Table 3. All of the CA operating classes may apply to bands that are not shown in the above table.

Figure 6:
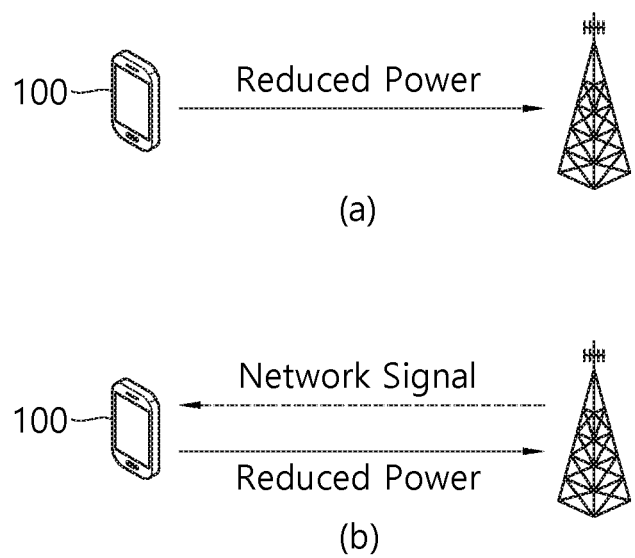
FIG. 6 illustrates an example of a method of limiting transmission power of a user equipment.

FIG. 6 illustrates an example of a method of limiting transmission power of a user equipment.

As can be seen from (a) of FIG. 6, the UE 100 conducts transmission with transmission power limited In case a PAPR (peak-to-average power ratio) is increased, linearity of the power amplifier (PA) is reduced, as an MPR (maximum power reduction) value for limiting transmission power, an MPR value up to 2 dB may apply depending on modulation schemes in order to maintain such linearity.

As can be seen from (b) of FIG. 6, the base station may apply A-MPR (additional maximum power reduction) by transmitting a network signal (NS) to the UE 100. The A-MPR, unlike the above-mentioned MPR, is that the base station transmits the network signal (NS) to the UE 100 operating at a specific operating band so that the UE 100 conducts additional power reduction in order not to affect adjacent bands, for example, not to give interference to the adjacent bands. That is, if the UE 100 applied with MPR receives a network signal (NS), A-MPR is additionally applied to determine transmission power.

Figure 7:
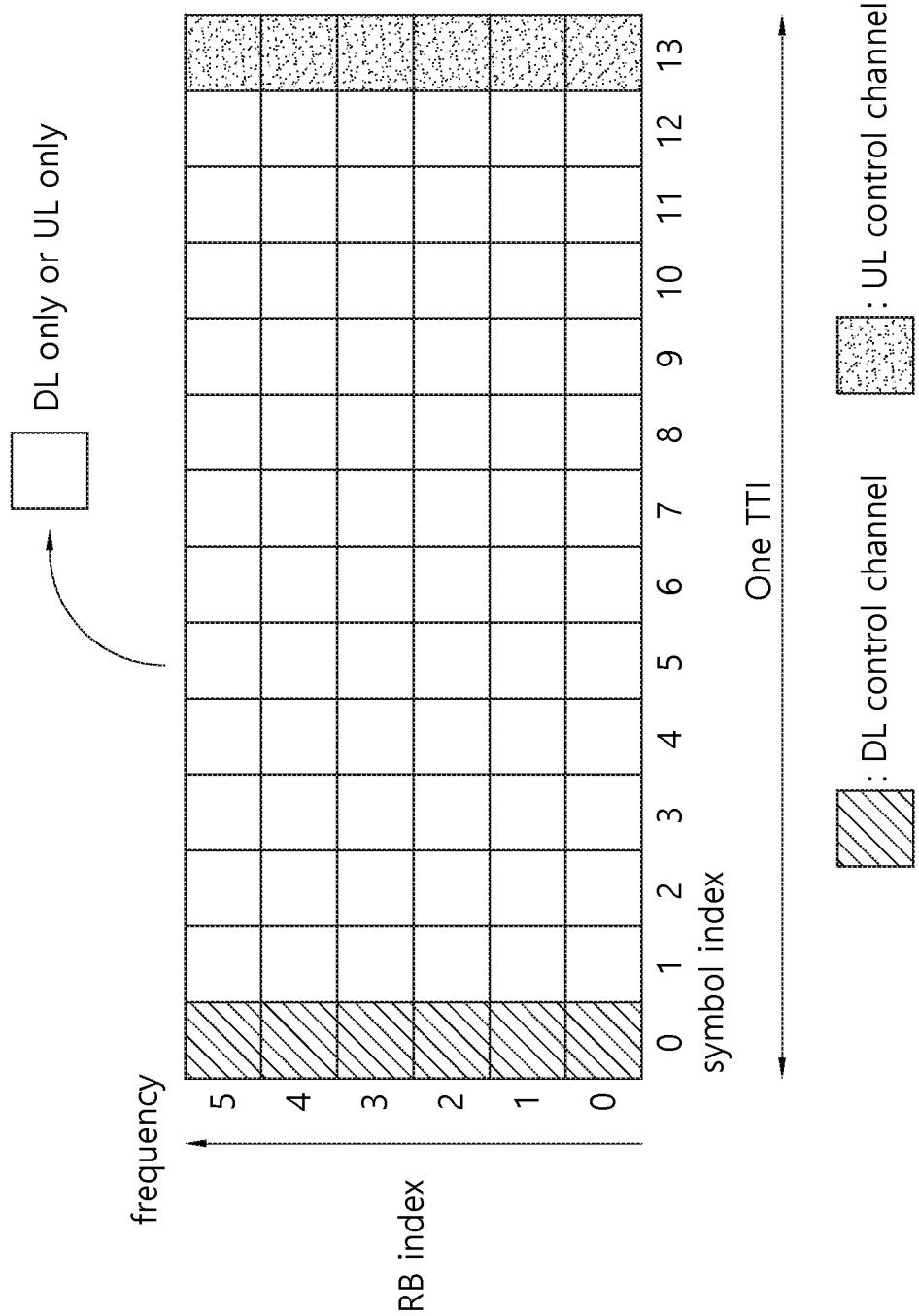
FIG. 7 illustrates an example of subframe types of 3GPP NR.

FIG. 7 illustrates an example of subframe types of 3GPP NR.

A transmission time interval (TTI) shown in FIG. 10 may also be referred to as a new RAT (NR). A subframe (or slot) of FIG. 10 may be used in a TDD system in a new RAT (or NR) in order to minimize data transmission latency. As shown in FIG. 10, just as the current subframe, a subframe (or slot) includes 14 symbols. Symbols located in a front part of the subframe (or slot) may be used for a DL control channel, and symbols located in a rear part of the subframe (or slot) a UL data transmission. According to the above-described subframe (or slot) structure, the downlink transmission and the uplink transmission may be sequentially performed in one subframe (or slot). Therefore, downlink data may be received in the subframe (or slot) and an uplink acknowledgement response (ACK/NACK) may be transmitted from the corresponding subframe (or slot). The above-described subframe (r slot) may also be referred to as a self-contained subframe (or slot). Using the above-described subframe (or slot) structure is advantageous in that it is capable of reducing the time that is consumed for retransmitting data having reception error, thereby minimizing the final data transmission latency time (or waiting time). In the above-described self-contained subframe (or slot) structure, a time gap may be required during a process of shifting from a Transmission mode to a Reception mode or shifting from a Reception mode to a transmission mode. For this, in the above-described subframe structure, when shifting from a DL to a UL, part of the OFDM symbols may be configured as a Guard Period (GP).

<Support of Diverse Numerology>

In the next generation system, with the evolution of the wireless communication technology, diverse numerology may be provided to a user device (or user equipment (UE)).

Herein, the numerology may be defined by a cycle prefix (CP) length and Subcarrier Spacing. One cell may provide multiple numerologies to the UE. When the index of a numerology is indicated as μ, each subcarrier spacing and the respective CP length are as shown below in the following table.

TABLE 5

| μ | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

In case of a normal CP, when the index of a numerology is indicated as μ, a number of OFDM symbols per slot (Nslotsymb), a number of slots per frame (Nframe,μslot), and a number of slots per subframe (Nsubframe, slot) are as shown below in the following table.

TABLE 6

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |

TABLE 6-continued

| μ | $N^{slot}_{symb}$ | $N^{frame,\mu}_{slot}$ | $N^{subframe,\mu}_{slot}$ |
|---|---|---|---|
| 3 | 14 | 80 | 8 |
| 4 | 14 | 160 | 16 |
| 5 | 14 | 320 | 32 |

In case of an extended CP, when the index of a numerology is indicated as μ, a number of OFDM symbols per slot (Nslotsymb), a number of slots per frame (Nframe,μslot), and a number of slots per subframe (Nsubframe,μslot) are as shown below in the following table.

TABLE 7

| μ | $N^{slot}_{symb}$ | $N^{frame,\mu}_{slot}$ | $N^{subframe,\mu}_{slot}$ |
|---|---|---|---|
| 2 | 12 | 40 | 4 |

Meanwhile, in the next generation mobile communication, each symbol within a symbol may be used for a downlink or for an uplink, as shown below in the following table. In the table show below, the uplink is indicated as U, and the downlink is indicated as D. In the following table, X represents a symbol that may be flexibly used for the uplink or the downlink.

TABLE 8

| For-mat | Symbol number within a Slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | X | X | U |
| 29 | D | D | D | D | D | D | D | D | D | D | X | X | X | U |
| 30 | D | D | D | D | D | D | D | D | D | X | X | X | U | U |
| 31 | D | D | D | D | D | D | D | D | D | X | X | U | U | U |
| 32 | D | D | D | D | D | D | D | D | X | X | X | U | U | U |
| 33 | D | D | D | D | D | D | D | X | X | X | U | U | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | U | U | U | U | U | U | U | U | U | U | U | U |
| 38 | D | D | X | U | U | U | U | U | U | U | U | U | U | U |
| 39 | D | D | D | X | U | U | U | U | U | U | U | U | U | U |
| 40 | D | X | X | U | U | U | U | U | U | U | U | U | U | U |
| 41 | D | D | X | X | U | U | U | U | U | U | U | U | U | U |

TABLE 8-continued

| For-mat | Symbol number within a Slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | D | X | D | D | D | D | D | D | D | X |
| 47 | D | D | D | D | X | X | D | D | D | D | D | X | X | X |
| 48 | D | D | X | X | X | X | X | D | D | X | X | X | X | X |
| 49 | D | X | X | X | X | X | X | D | X | X | X | X | X | X |
| 50 | X | U | U | U | U | U | X | U | U | U | U | U | U | U |
| 51 | X | X | U | U | U | U | U | X | U | U | U | U | U | U |
| 52 | X | X | U | U | U | U | U | X | X | U | U | U | U | U |
| 53 | X | X | X | U | U | U | U | X | X | X | U | U | U | U |
| 54 | D | D | D | D | X | U | D | D | D | D | X | U | U | U |
| 55 | D | D | X | U | U | U | U | D | D | X | U | U | U | U |
| 56 | D | X | U | U | U | U | U | D | X | U | U | U | U | U |
| 57 | D | D | D | D | X | X | U | D | D | D | D | X | X | U |
| 58 | D | D | X | X | U | U | U | D | D | X | X | U | U | U |
| 59 | D | X | X | U | U | U | U | D | X | X | U | U | U | U |
| 60 | D | X | X | X | X | U | D | X | X | X | X | X | X | U |
| 61 | D | D | X | X | X | U | D | D | X | X | X | X | X | U |

Figure 8:
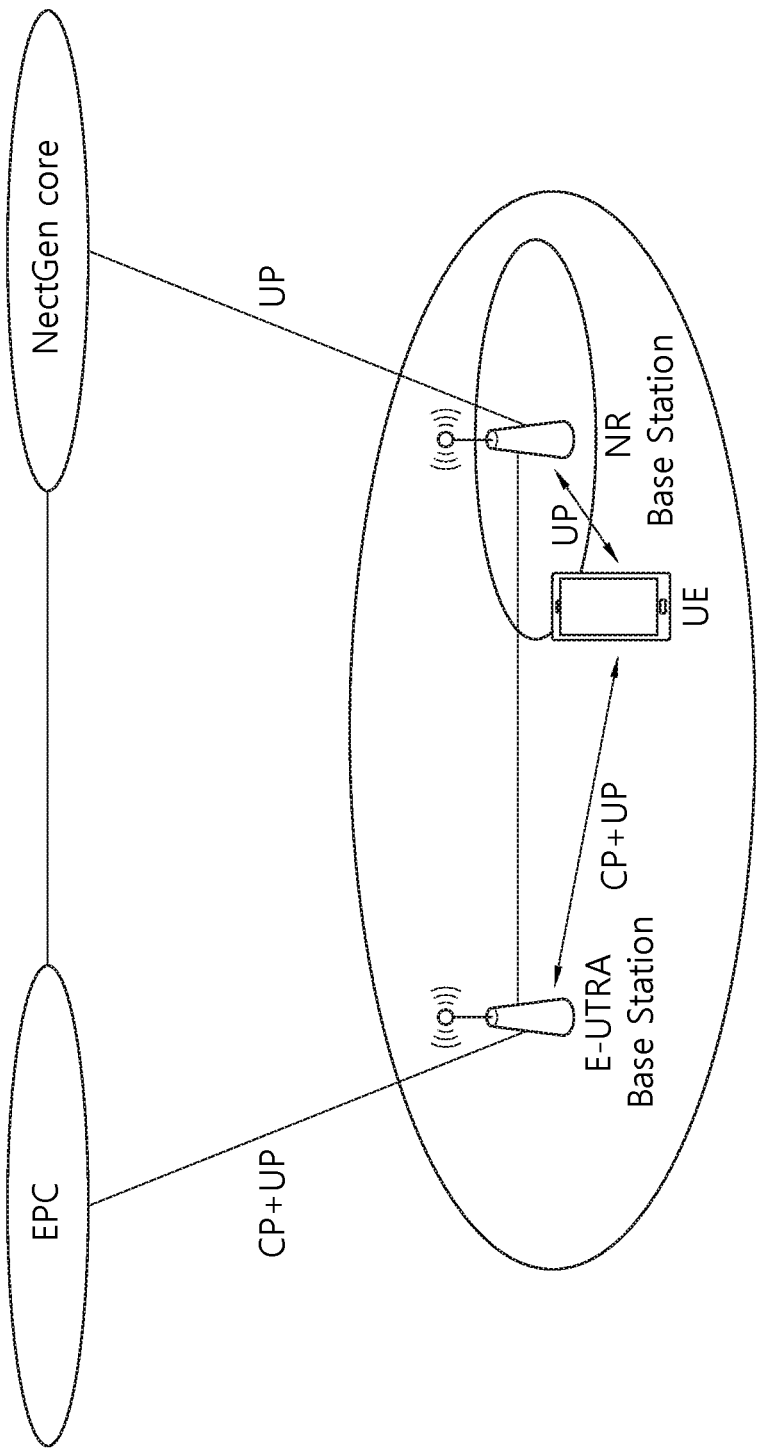
FIG. 8 illustrates an example of NSA operation mode.

FIG. 8 illustrates an example of NSA operation mode.

FIG. 8 illustrates an example of UE operates in NSA operation mode. Also, FIG. 8 illustrates an example of connection state between UE and E-UTRA base station, an example of connection state between UE and NR base station, an example of connection state between E-UTRA base station and NR base station, an example of connection state between Evolved Packet Core (EPC) which is a core network of E-UTRA and NextGen Core which is a core network of NR, an example of connection state between EPC and E-UTRA base station, an example of connection state between NextGen Core and NR base station, and connection state of Control plane (CP) and User place (UP).

In FIG. 8, E-UTRA base station may use frequency band of 6 GHz or less than 6 GHz and operate as Macro cell to provide wider coverage. NR base station may use frequency band of 6 GHz or more than 6 GHz, which include 28 GHz band and mmWave band. NR base station can may operate as small cell.

EPC and NextGen Core exist separately, they is an interface which connect EPC and NextGen Core. In an example of NSA operation mode shown in FIG. 8, UE may be connected with E-UTRA base station and EPC through CP and UP, and UE may be connected with NR base station and NextGen Core through UP.

FIG. 8 is only an example of NSA operation mode, there are more examples of NSA operation mode. For instance, UE may be connected with NR base station and NextGen Core through CP and UP, and E-UTRA base station may perform some part of control function of CP. Also, both NR base station and E-UTRA base station may be connected to one core network, only to NextGen Core or EPC.

Disclosure of the Present Specification

As described above, there might be a problem that total transmission power configured for E-UTRA uplink signal and NR uplink signal overlap in time exceeds power class, which is a maximum output power configured to the UE. Thus, when the UE in NSA operation mode determine total transmission power, there is a need to consider both the E-UTRA uplink signal and the NR uplink signal which overlap in time to prevent exceeding maximum permissible exposure (MPE) or specific absorption rate (SAR).

Also, there is a need to take a reference for determining total transmission power based on a consideration of both the E-UTRA uplink signal and the NR uplink signal which overlap in time.

Therefore, the present specification proposes a method for determining transmission power for uplink signal based on both the E-UTRA uplink signal and the NR uplink signal which overlap in time. Also, the method provides the reference for determining total transmission power. Thus, the total transmission power may be determined more precisely, so that the total transmission power does not exceed power class, the maximum output power.

The below table 9 is definition of frequency ranges.

TABLE 9

| Frequency range designation | Corresponding frequency range |
|---|---|
| Frequency Range 1 (FR 1) | 450 MHz-6000 MHz |
| Frequency Range 2 (FR 2) | 24250 MHz-52600 MHz |

It is previously studied that when NSA UE, which is a UE can operate in NSA operation mode, performs NSA operation mode with both LTE band (same as E-UTRA band) and NR band in FR1, power sharing mechanism for the configured transmission (Tx) power in NSA UE RF requirements are applied. It is also previously studied that when NSA UE performs NSA operation mode with LTE band in FR 1 and NR band in FR 2, individual configured Tx power requirement between legacy E-UTRA band in FR 1 and NR band in FR 2 are applied, and P-MPR, which is an allowed maximum output power reduction, is considered for FR 2 as well.

It is also previously studied UE behavior when total transmission power exceeds the $P_{CMAX}$, which is a total configured maximum output power, as below:

if the total transmission power exceeds P_cmax when there is simultaneous NR and LTE UL tx, 1) For NR, UE scales down/drops NR transmission and NR power scaling details are left to UE implementation. Also, If there are two or more uplink (UL) carriers, the power scaling or tx dropping can be performed for each of the UL carriers separately or jointly up to UE implementation 2) For LTE, no change in power control procedure The present specification provide the UE configured Tx power for Dual Connectivity (DC) UE, which is a UE can perform dual connectivity operation, at sub-6 GHz (FR 1) based on above previous studies.

1. LTE DC Operation

For LTE DC operation, the DC UE configured Tx power considering both synchronous transmission and asynchronous transmission according to the which Component Carrier (CC) is leading case as below.

In case, $P_{CMAX\_L}$, which is a lower limit for the $P_{CMAX}$, and $P_{CMAX\_H}$, which is a higher limit for the $P_{CMAX}$, are determined by the reference subframe which is always determined as a leading sub-frame between master cell group (MCG) and secondary cell group (SCG).

If the UE is configured in Dual Connectivity and asynchronous transmissions, the subframes of the leading cell group (CG) are taken as reference subframes for the measurement of the total configured output power $P_{UMAX}$. If subframe p of CG 1 and subframe q of CG 2 overlap in time in their respective slot 0 and if p leads in time over q, then p is the reference subframe and the (p,q) and (p,q−1) pairs are considered for determining the $P_{CMAX}$ tolerance if q leads in time over p, then q is the reference subframe and the (p−1,q) and (p,q) pairs are considered for determining the $P_{CMAX}$ tolerance;

For the reference subframe p duration (when subframe p in CG 1 leads), the following Equation 1 is applied.

$$P'_{CMAX\_L} = \mathrm{MIN}\{P_{CMAX\_L}(p,q), P_{CMAX\_L}(p,q-1)\}$$

$$P'_{CMAX\_H} = \mathrm{MAX}\{P_{CMAX\_H}(p,q), P_{CMAX\_H}(p,q-1)\} \quad \text{[Equation 1]}$$

In Equation 1, $P'_{CMAX\_L}$ is a minimum value between lower limits, $P_{CMAX\_L}$ (p,q) and $P_{CMAX\_L}$ (p,q−1), for the total transmission power of the scheduling pairs which overlap in time during the reference subframe p duration. $P'_{CMAX\_H}$ is a maximum value between higher limits, $P_{CMAX\_H}$ (p,q) and $P_{CMAX\_H}$ (p,q−1), for the total transmission power of the scheduling pairs which overlap in time during the reference subframe p duration. Hereinafter, p and q is an integer including 0 and positive integer.

For the reference subframe q duration (when subframe q in CG 2 leads), the following Equation 2 is applied, lower limits for the total transmission power of the scheduling pairs which overlap in time $$P'_{CMAX\_L} = \mathrm{MIN}\{P_{CMAX\_L}(p-1,q), P_{CMAX\_L}(p,q)\}$$

$$P'_{CMAX\_H} = \mathrm{MAX}\{P_{CMAX\_H}(p-1,q), P_{CMAX\_H}(p,q)\} \quad \text{[Equation 2]}$$

In Equation 2, In Equation 1, $P'_{CMAX\_L}$ is a minimum value between lower limits, $P_{CMAX\_L}$ (p,q) and $P_{CMAX\_L}$ (p,q−1), for the total transmission power of the scheduling pairs which overlap in time during the reference subframe q duration. $P'_{CMAX\_H}$ is a maximum value between higher limits, $P_{CMAX\_H}$ (p,q) and $P_{CMAX\_H}$ (p,q−1), for the total transmission power of the scheduling pairs which overlap in time during the reference subframe q duration.

The DC operation in LTE system can be changed the each MCG and SCG transmitted output power if the $P_{CMAX\_H}$ is over the UE power class, then the DC UE should scale down the MCG and/or SCG to meet the maximum output power of UE power class.

Result: For DC operation in LTE system, if the $P_{CMAX\_H}$ exceeds the UE power class, then the DC UE should scale down the MCG and/or SCG to meet the maximum output power of UE power class.

However, previous study determined that only NR band will be scale down/drop on the NR transmission and not allow the change of the transmission power of LTE signal.

So the configured Tx power should be determined based on LTE signal as reference sub-frame to keep the transmission power of LTE signal. This approach is similar for ProSe (Proximity Services) which should be protect WAN signal as shown in FIGS. 9A and 9B.

Figure 9A:
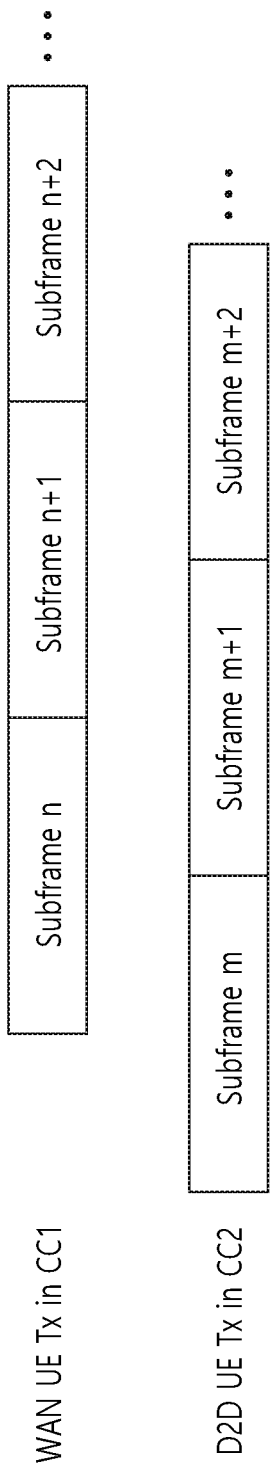
FIG. 9A illustrates an example of Device-to-Device (D2D) leading case of LTE Proximity Services.

FIG. 9A illustrates an example of D2D leading case of LTE Proximity Services. FIG. 9B illustrates an example of WAN leading case of LTE Proximity Services.

Figure 9B:
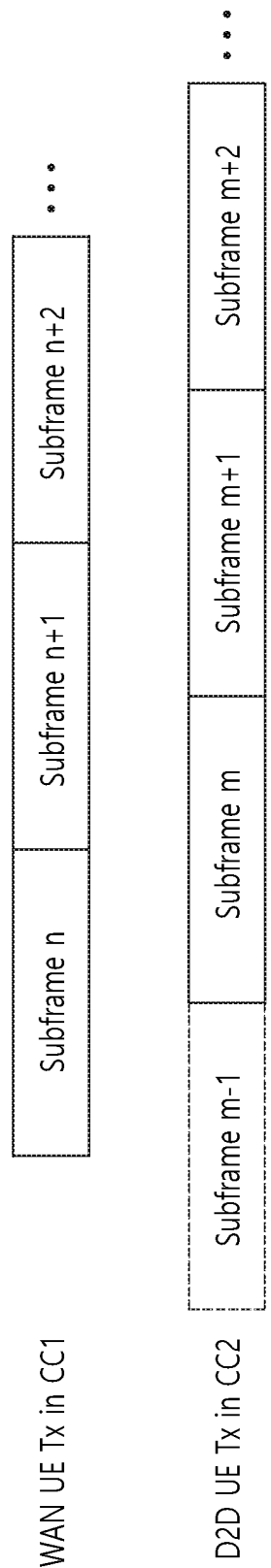
FIG. 9B illustrates an example of WAN leading case of LTE Proximity Services.

In FIG. 9 A and FIG. 9B, examples of wide area network (WAN) transmission (also called cellular transmission which corresponds to LTE transmission) and D2D (also called Proximity Services, ProSe) transmission performed by the UE simultaneously. Subframes of WAN transmission always taken as a reference for determining total transmission power.

In detail, FIG. 9A is D2D leading case which means subframes of D2D transmission lead subframes of WAN transmission during LTE and ProSe concurrent operation. In this case, subframe m of D2D transmission leads subframe n of WAN transmission. During a duration of the subframe n, which is a reference subframe, subframe m and subframe m+1 overlap in time with the subframe n. Also, During a duration of the subframe n+1, which is a reference subframe, subframe m+1 and subframe m+2 overlap in time with the subframe n+1.

FIG. 9B is WAN leading case which means subframes of WAN transmission lead subframes of D2D transmission during LTE and ProSe concurrent operation. In this case, subframe n of WAN transmission leads subframe m of D2D transmission. During a duration of the subframe n, which is a reference subframe, subframe m and subframe m−1 overlap in time with the subframe n. Also, During a duration of the subframe n+1, which is a reference subframe, subframe m and subframe m+1 overlap in time with the subframe n+1.

For determining total transmission power during LTE and ProSe concurrent operation, the UE consider subframes overlap in time based on reference subframes of WAN transmission. That is, the reference subframe is always defined as LTE legacy transmission regardless of which CC is leading subframe.

When a UE is configured for asynchronous ProSe and uplink transmissions, the carrier configured for uplink transmission is taken as the reference. If subframe p for the E-UTRA uplink carrier and subframe q for the E-UTRA ProSe carrier overlap in time and If uplink carrier leads in time over q, then p is the reference subframe and, the (p,q) and (p,q−1) pairs are considered for determining the $P_{CMAX}$ tolerance If ProSe carrier leads in time over p, then p is the reference subframe and, the (p,q) and (p,q+1) pairs are considered for determining the $P_{CMAX}$ tolerance For the reference subframe p duration when uplink carrier leads, the following Equation 3 is applied.

$$P'_{CMAX\_L} = P_{CMAX\_L,cE-UTRA}(p)$$

$$P'_{CMAX\_H} = MAX\{P_{CMAX\_H}(p,q-1), P_{CMAX\_H}(p,q)\} \quad \text{[Equation 3]}$$

In Equation 3, $P_{CMAX\_L,cE-UTRA}(p)$ is a lower limit for the configured maximum output power. $P_{CMAX\_H}(p,q)$ is an upper limit for the configured maximum output power. For determining $P'_{CMAX\_H}$, the (p,q−1) and (p,q) pairs are considered. $P'_{CMAX\_L}$ is used for a lower limit for a measured configured maximum output power and $P'_{CMAX\_H}$ is used for a higher limit for a measured configured maximum output power.

For the reference subframe p duration when ProSe carrier leads, the following Equation 4 is applied.

$$P'_{CMAX\_L} = P_{CMAX\_L,cE-UTRA}(p)$$

$$P'_{CMAX\_H} = MAX\{P_{CMAX\_H}(p,q), P_{CMAX\_H}(p,q+1)\} \quad \text{[Equation 4]}$$

In Equation 4, $P_{CMAX\_L,cE-UTRA}(p)$ is a lower limit for the configured maximum output power. $P_{CMAX\_H}(p,q)$ is an upper limit for the configured maximum output power. For determining $P'_{CMAX\_H}$, the (p,q) and (p,q+1) pairs are considered. $P'_{CMAX\_L}$ is used for a lower limit for a measured configured maximum output power and $P'_{CMAX\_H}$ is used for a higher limit for a measured configured maximum output power.

2. E-UTRA/NR Dual Connectivity (EN-DC) Operation

One clarification point is that RAN1 agree to support self-contained slot for NR UE, which is a UE can operate in NR. In LTE system, the time difference is always 4 ms for PUCCH transmission w/HARQ feedback of PDSCH reception. Also the time difference between is always 4 ms for PUSCH transmission after PDCCH reception in FDD mode.

However, in NR system, the PDSCH and PUCCH for HARQ feedback can be allocated in a slot. Also the PDCCH for Downlink Control Information (DCI) uplink grant and PUSCH transmission also allocated in a slot.

FIG. 10 A illustrates an first example of E-UTRA uplink signal and NR uplink signal overlaps in time. FIG. 10 B illustrates a second example of E-UTRA uplink signal and NR uplink signal overlaps in time.

In NR, K1 or K2 flexibility is considered as shown in FIGS. 10 A and 10 B for a total UE configured maximum output power Pcmax definition of DC UE. K1 is a delay between DL data (PDSCH) reception and corresponding acknowledgement transmission on UL. K2 is a delay between UL grant reception in DL and UL data (PUSCH) transmission.

Figure 10A:
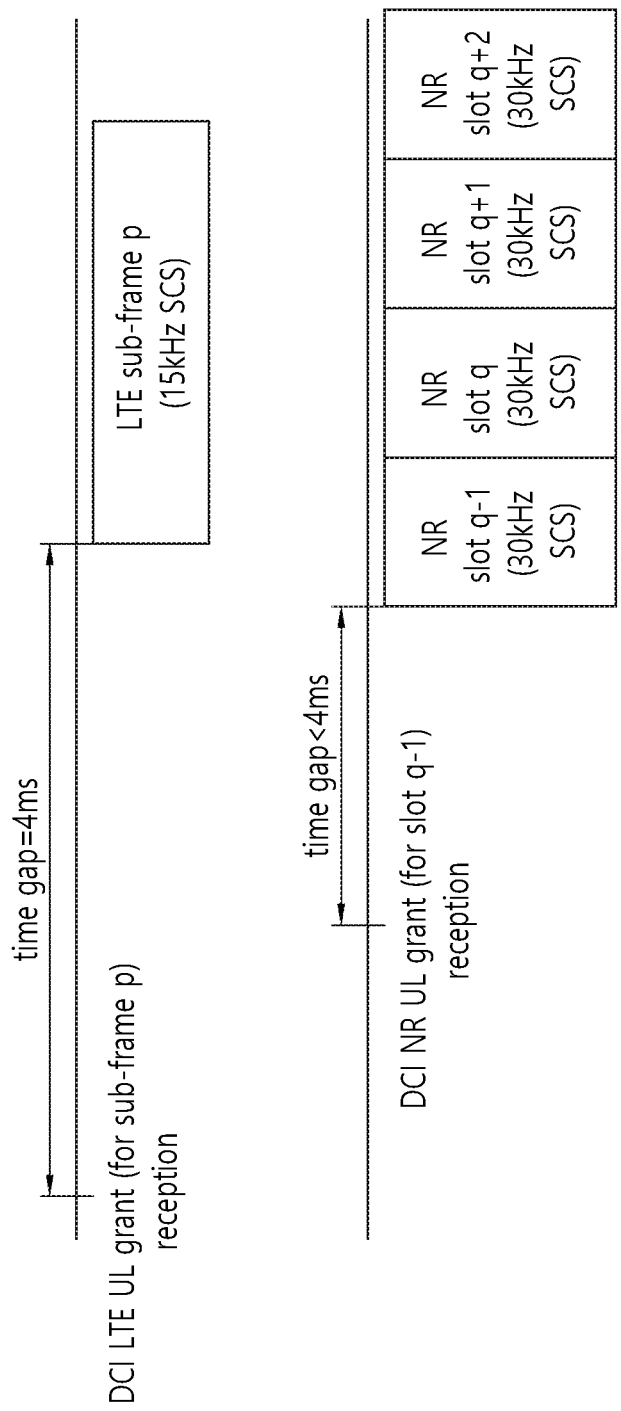
FIG. 10A illustrates an first example of E-UTRA uplink signal and NR uplink signal overlaps in time.

FIG. 10A illustrates Case 1: K1 and/or K2<4 ms (including K1, K2=0 for self contained in a slot). In LTE, 15 kHz sub carrier spacing (SCS) is used and the DCI LTE UL grant for subframe p is received by the UE in time gap of 4 ms to the start of transmission for subframe p. Different types of SCS can be used in NR, in FIG. 10A, 30 kHz SCS is used. The DCI NR UL grant for slot q−1 can be received by the UE in time gap less than 4 ms to the start of transmission for subframe q−1.

Figure 10B:
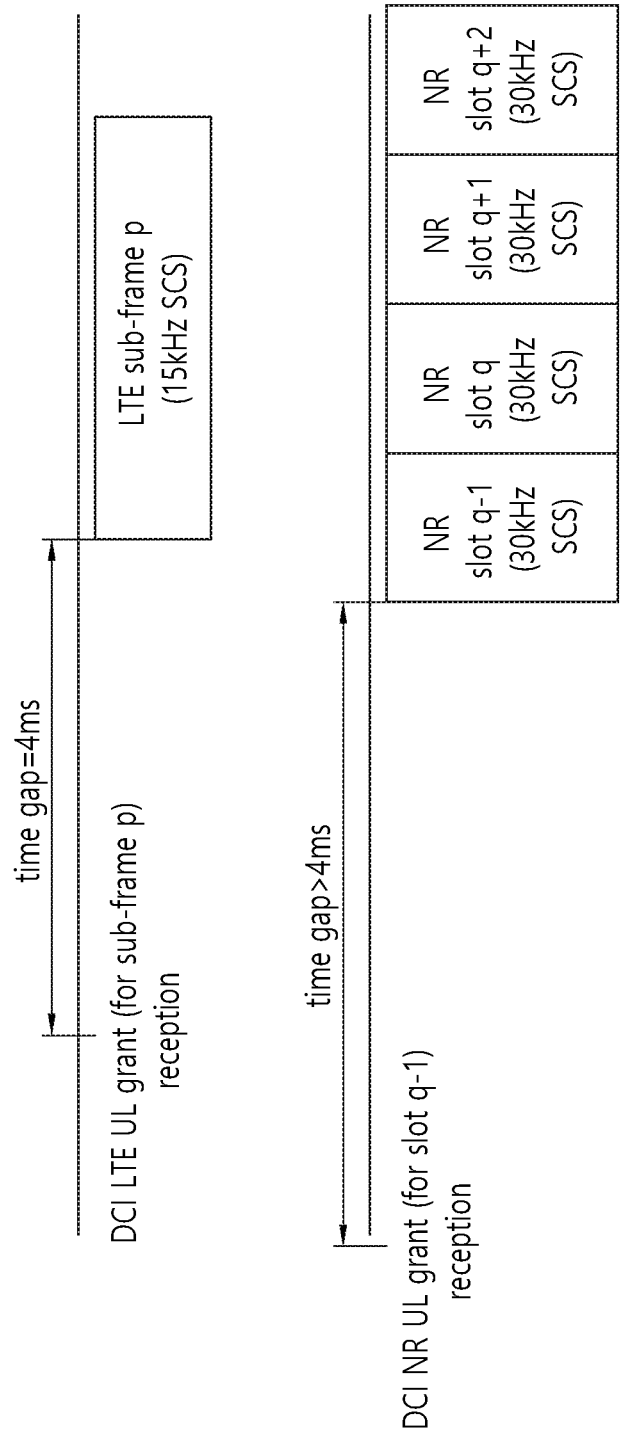
FIG. 10B illustrates a second example of E-UTRA uplink signal and NR uplink signal overlaps in time.

FIG. 10B illustrates Case 2: K1 and/or K2≥4 ms (including K1, K2=0 for self contained in a slot). In LTE, 15 kHz sub carrier spacing (SCS) is used and the DCI LTE UL grant for subframe p is received by the UE in a time gap of 4 ms to the start of transmission for subframe p. Different types of SCS can be used in NR, in FIG. 10B, 30 kHz SCS is used. The DCI NR UL grant for slot q−1 can be received by the UE in time gap more than 4 ms to the start of transmission for subframe q−1.

Figure 11A:
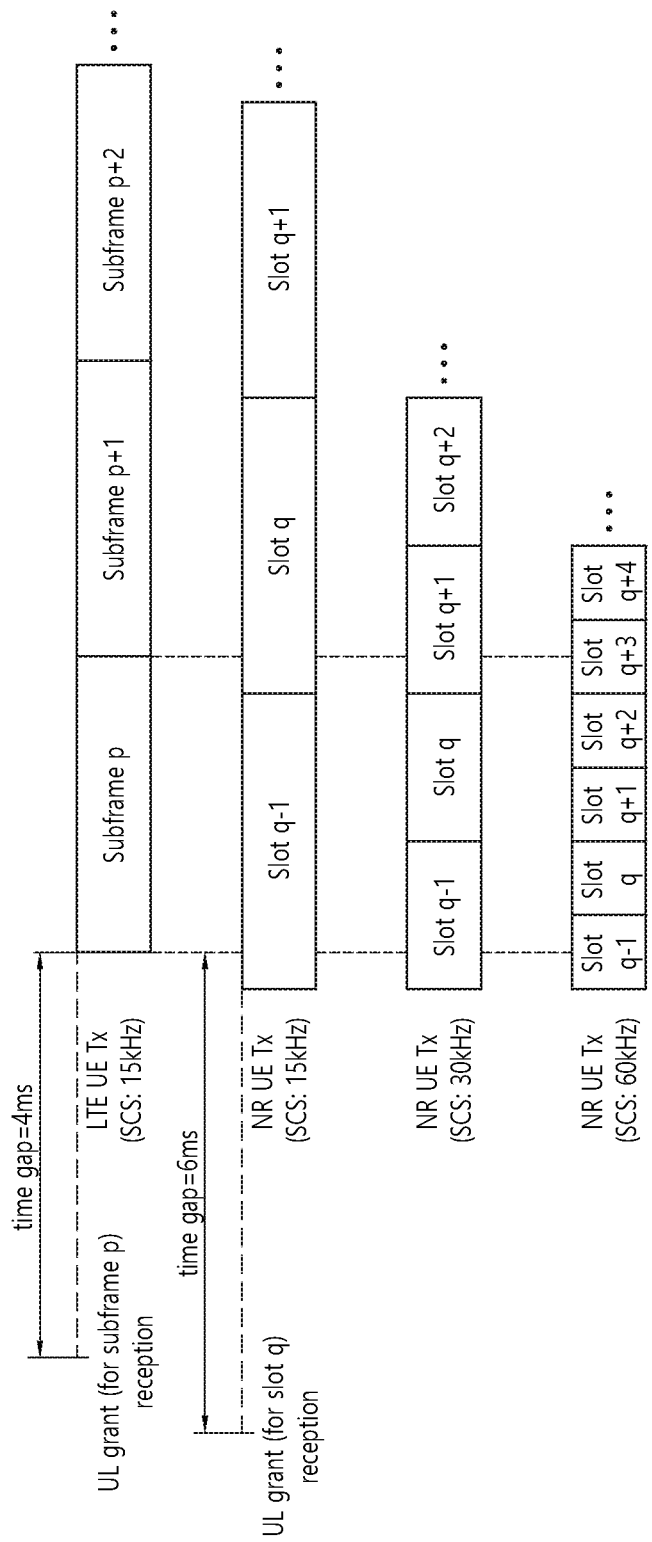
FIG. 11A illustrates an example of scheduling units of E-UTRA leading case in E-UTRA/NR Dual Connectivity operation.
Figure 11B:
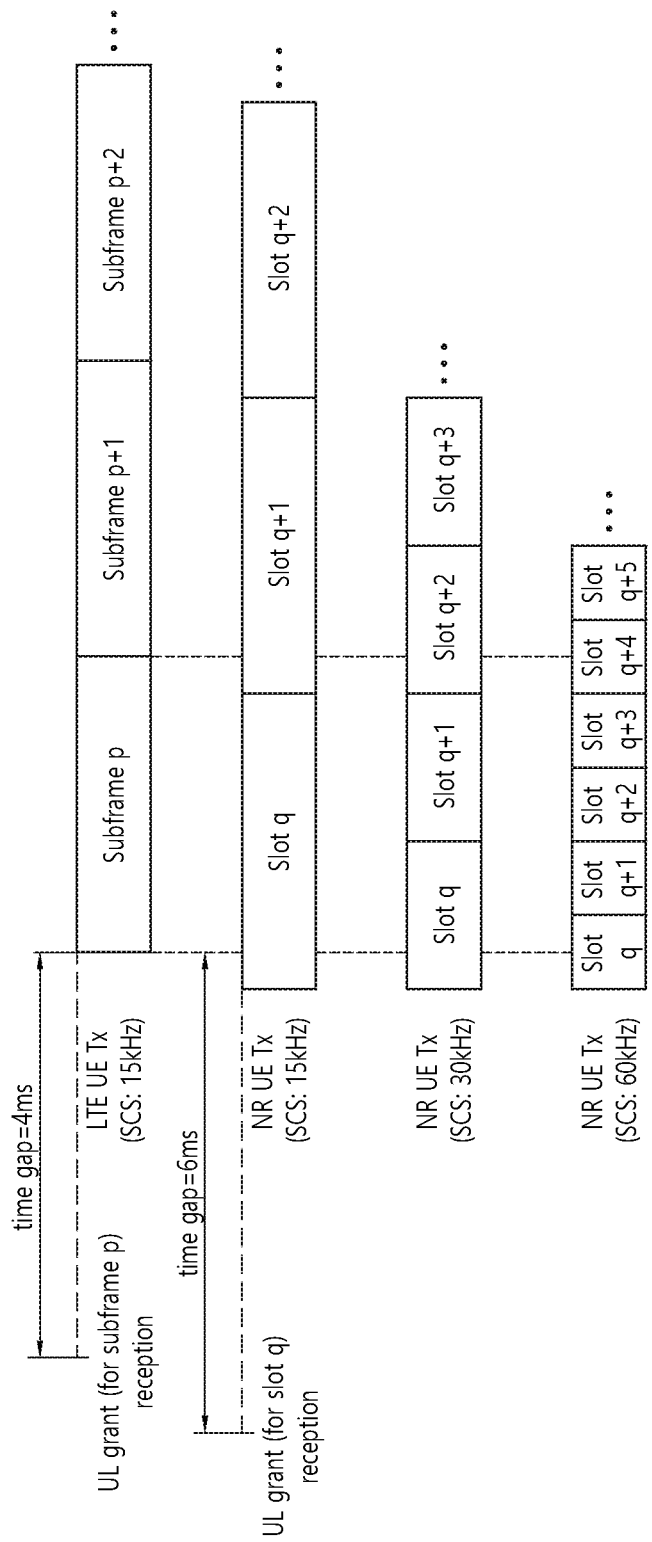
FIG. 11B illustrates an example of scheduling units of NR leading case in E-UTRA/NR Dual Connectivity operation.

In Case2 of FIG. 10B, the total transmission power should be determined by the UE based on LTE reference frame p since the UE performing EN-DC operation already knew the Tx power for each transmission according to leading subframe or slot. FIG. 11A and FIG. 11B further illustrates Case 2.

FIG. 11 A illustrates an example of scheduling units of E-UTRA leading case in E-UTRA/NR Dual Connectivity operation. FIG. 11 B illustrates an example of scheduling units of NR leading case in E-UTRA/NR Dual Connectivity operation.

FIG. 11A is an example of scheduling units of E-UTRA leading case when K2≥4 ms in NR. In LTE, 15 kHz sub carrier spacing (SCS) is used and the DCI LTE UL grant for subframe p is received by the UE in time gap of 4 ms to the start of transmission for subframe p. The DCI NR UL grant for slot q is received in a time gap of 6 ms to the start of transmission for subframe p. If SCS 15 kHz is configured, slot q−1, slot q overlap with subframe p. If SCS 30 kHz is configured, slot q−1, slot q and slot q+1 overlap with subframe p. If SCS 60 kHz is configured, slot q−1, slot q, slot q+1, slot q+2 and slot q+3 overlap with subframe p.

FIG. 11B is an example of scheduling units of NR leading case when K1 and/or K2≥4 ms in NR. In LTE, 15 kHz sub carrier spacing (SCS) is used and the DCI LTE UL grant for subframe p is received by the UE in time gap of 4 ms to the start of transmission for subframe p. The DCI NR UL grant for slot q is received in a time gap of 6 ms. If SCS 15 kHz is configured, slot q, slot q+1 overlap with subframe p. If SCS 30 kHz is configured, slot q, slot q+1 and slot q+2 overlap with subframe p. If SCS 60 kHz is configured, slot q, slot q+1, slot q+2, slot q+3 and slot q+4 overlap with subframe p.

The present specification provides that E-UTRA subframe is always taken as a reference subframe to determine the total transmission power for the UE performing EN-DC operation. Especially, E-UTRA subframe is taken as a reference subframe to determine a total maximum output power $P_{UMAX}$, $P'_{CMAX\_L}$ and $P'_{CMAX\_H}$ as described below in Equation 13, 14 and 15.

FIG. 12 illustrates an example of scheduling units of E-UTRA/NR Dual Connectivity operation when a reception of E-UTRA uplink grant is earlier.

In Case 1, if K2<4 ms in NR, then NR PUSCH transmission will be operated in a shorter time than LTE UE as shown in FIG. 12. FIG. 12 is an example of scheduling units of E-UTRA leading case when K2<4 ms in NR. In LTE, 15 kHz sub carrier spacing (SCS) is used and the DCI LTE UL grant for subframe p is received by the UE in time gap of 4 ms to the start of transmission for subframe p. The DCI NR UL grant for slot q is received in a time gap of 2 ms to the start of transmission for subframe p. If SCS 15 kHz is configured, slot q−1, slot q overlap with subframe p. If SCS 30 kHz is configured, slot q−1, slot q and slot q+1 overlap with subframe p. If SCS 60 kHz is configured, slot q−1, slot q, slot q+1, slot q+2 and slot q+3 overlap with subframe p.

If the UE supports self-contained slot or small time interval with K1 and/or K2<4 ms, then DC UE should have Pcmax calculating and applying sufficient power or dropping for the NR transmission not to over the power class of the UE. But this is quite depending on UE implementation performance. Especially when NSA DC UE consider different modem chipset between NR and LTE (E-UTRA) system, then the inter-process communication delay may happen for sharing the each carrier allocated power.

For the Case 1 in FIG. 12, UE performs signaling to indicate whether the UE supports dynamic EN-DC power sharing. Herein, the dynamic power sharing or dynamic EN-DC power sharing mean that the UE can operate with P_LTE+P_NR>P_powerclass configuration. In RAN plenary #78, 3GPP consider two types of UE in rel-15 as below (1) UE Type 1 capable of dynamic LTE-NR power sharing
  i. Converged NR and LTE modem with high speed interface capability
  ii. These UEs can operate with P_LTE+P_NR>P_powerclass configuration or with no P_LTE or P_NR configuration (2) UE Type 2 not capable of dynamic LTE-NR power sharing
  i. Separate NR and LTE modem with limited interface capability
  ii. These UEs can only operate in EN-DC when a configuration is received with P LTE+P_NR<=P_powerclass P_LTE is configured transmission power for LTE uplink signal, which is same as E-UTRA uplink signal. P_NR is configured transmission power for NR uplink signal. P_powerclass is power class, which is a total maximum output power for any transmission bandwidth of the CG(s) configured. If the UE supports dynamic EN-DC power sharing capability (UE Type 1), the UE can dynamically share the power between NR and LTE if P_LTE+P_NR>P_powerclass.

For UEs does not support dynamic EN-DC power sharing capability (UE Type 2), the UEs support single UL operation with capability signaling to base stations. Single UL operation is optional for UEs support dynamic power sharing capable.

The following Table 10 is summarization of EN-DC performing ability for UEs not supporting dynamic power sharing (UE Type 1) and UEs supporting dynamic power sharing (UE Type 2).

TABLE 10

| Feedback time | UE capable of dynamic Power sharing (UE Type 1) | | UE not capable of dynamic Power sharing (UE Type 2) | |
|---|---|---|---|---|
| | Total power ≤ power class | Total power > power class | Total power ≤ power class | Total power > power class |
| K1, K2 < 4 ms | ○ | ○ | ○ | Single Uplink |
| K1, K2 ≥ 4 ms | ○ | ○ | ○ | Single Uplink |

As shown in Table 10, UEs capable of dynamic power sharing (UE Type 1) can perform EN-DC in any cases. UEs not capable of dynamic power sharing (UE Type 2) can perform EN-DC if total power configured to the UEs is same as the power class or less than the power class. UEs not capable of dynamic power sharing (UE Type 2) cannot perform EN-DC, the UEs can perform single uplink transmission which means only performing E-UTRA transmission or NR transmission.

3. UE Configured Transmission Power for EN-DC Operation at FR 1 (Sub-6 GHz)

For inter-band or intra-band with two RF chains dual connectivity with one uplink serving cell per CG on E-UTRA and NR respectively, the UE is allowed to determine the UE's configured maximum output power $P_{CMAX,c(i),i}$ for each serving cell c(i) of CGi, i=1,2, and its total configured maximum output power $P_{CMAX}$.

The configured maximum output power $P_{CMAX,c(i),i}$ (p) in a scheduling unit (E-UTRA transmission time interval (TTI), shortened TTI (sTTI) or NR slot) p of serving cell c(i) on CGi shall be set within the following Equation 5

$$P_{CMAX\_L,c(i),i}(p) \leq P_{CMAX,c(i),i}(p) \leq P_{CMAX\_H,c(i),i}(p) \quad \text{[Equation 5]}$$

In Equation 5, $P_{CMAX\_L,c(i),i}$ (p) is a lower limit for the configured maximum output power $P_{CMAX,c(i),i}$ (p) in a scheduling unit p of serving cell c(i) on CGi. $P_{CMAX\_H,c(i),i}$ (p) a higher limit for the configured maximum output power $P_{CMAX,c(i),i}$ (p) in a scheduling unit p of serving cell c(i) on CGi. If the serving cell c(i) is E-UTRA serving cell, Equation 6 explained below is used by the UE. If the serving cell c(i) is NR serving cell, Equation 9 explained below is used by the UE.

If the UE's NR uplink signal transmissions and E-UTRA uplink signal transmissions do not overlap in time, then the configured maximum output powers for E-UTRA and NR are applied respectively.

If the UE is configured for simultaneous E-UTRA uplink and NR uplink transmissions for inter-band EN DC bands, the UE may determine its configured maximum output power $P_{CMAX,c,E-UTRA}$ and $P_{CMAX,c,NR}$ for the configured E-UTRA uplink carrier and the configured NR carrier, respectively. Meanwhile, the terms "$P_{CMAX,c,E-UTRA}$" and "$P_{CMAX,c,NR}$" are examples of terms for the configured maximum output power, so different terms can be used such as "$P_{CMAX\ E-UTRA,c}$" and "$P_{CMAX,f,c,NR}$". Also, the UE may determine its total configured maximum output power $P_{CMAX,c}$ for both E-UTRA uplink signal and NR uplink signal.

The configured maximum output power $P_{CMAX,c,E\text{-}UTRA}$ (p) in sub-frame p for the configured E-UTRA uplink carrier may be determined by the UE based on the following Equation 6.

$$P_{CMAX\_L,c,E\text{-}UTRA}(p) \leq P_{CMAX,c,E\text{-}UTRA}(p) \leq P_{CMAX\_H,c,E\text{-}UTRA}(p) \quad \text{[Equation 6]}$$

$P_{CMAX\_L,c,E\text{-}UTRA}$ (p) is a lower limit for the configured maximum output power $P_{CMAX,c,E\text{-}UTRA}$ (p) in a scheduling unit p for an E-UTRA serving cell c. $P_{CMAX\_H,c,E\text{-}UTRA}$ (p) a higher limit for the configured maximum output power $P_{CMAX,c,E\text{-}UTRA}$ (p) in a scheduling unit p for an E-UTRA serving cell c. In detail, the UE may determine $P_{CMAX\_L,c,E\text{-}UTRA}$ and $P_{CMAX\_H,c,E\text{-}UTRA}$ based on the following Equation 7.

$$P_{CMAX\_L,c,E\text{-}UTRA} = \text{MIN}\{P_{EMAX,c} - \Delta T_{C,c}, (P_{PowerClass} - \Delta P_{PowerClass}) - \text{MAX}(MPR_c + A\text{-}MPR_c + \Delta T_{IB,c} + \Delta T_{C,c} + \Delta T_{ProSe}, P\text{-}MPR_c)\}$$

$$P_{CMAX\_H,c,E\text{-}UTRA} = \text{MIN}\{P_{EMAX,c}, P_{PowerClass} - \Delta P_{PowerClass}\} \quad \text{[Equation 7]}$$

In Equation 7, $P_{EMAX,c}$ is Maximum allowed UE output power signaled by higher layers for serving cell c, $P_{EMAX,c}$ is given by Information Element (IE) P-Max for serving cell c. The IE P-Max is defined as the following Table 11.

TABLE 11

| -- ASN1START | |
|---|---|
| P-Max ::= | INTEGER (−30..33) |
| -- ASN1STOP | |

$P_{PowerClass}$ is the maximum UE power without taking into account the tolerance $\Delta P_{PowerClass} = 3$ dB for a power class 2 capable UE operating in Band 41, when P-max of 23 dBm or lower is indicated or if the uplink/downlink configuration is 0 or 6 in the cell, otherwise, $\Delta P_{PowerClass} = 0$ dB $MPR_c$ is a maximum power reduction for serving cell c and $A\text{-}MPR_c$ is a additional maximum power reduction for serving cell c.

$\Delta T_{IB,c}$ is the additional tolerance for serving cell c in the following Table 12, $\Delta T_{IB,c} = 0$ dB otherwise.

TABLE 12

| E-UTRA operating band combination | E-UTRA Band | ΔTIB,c [dB] |
|---|---|---|
| CA_1-3, CA_1-1-3, CA_1-3-3 | 1 | 0.3 |
| | 3 | 0.3 |
| CA_1-5 | 1 | 0.3 |
| | 5 | 0.3 |

$\Delta T_{C,c}$ is Allowed operating band edge transmission power relaxation for serving cell c. $\Delta T_{C\_NR,c} = 1.5$ dB when NOTE 1 (for E-UTRA band 2, 3, 7, 8, 12, 20, 22, 25, 26, 41, 85, refers to the transmission bandwidths confined within $F_{UL\_low}$ and $F_{UL\_low} + 4$ MHz or $F_{UL\_high} - 4$ MHz and $F_{UL\_high}$, the maximum output power requirement is relaxed by reducing the lower tolerance limit by 1.5 dB) applies for a serving cell c. Otherwise, $\Delta T_{C\_NR,c} = 0$ dB.

$\Delta T_{ProSe} = 0.1$ dB when the UE supports ProSe Direct Discovery and/or ProSe Direct Communication on the corresponding E-UTRA ProSe band, and $\Delta T_{ProSe} = 0$ dB otherwise.

For a power class higher than default UE power class capable UE, $\Delta P_{PowerClass} = P_{PowerClass} - P_{PowerClass\_Default}$ dB, when the band is a TDD band whose frame configuration is 0 or 6, or P-max is not indicated in the cell, or P-max is provided and set to the maximum output power of the default power class or lower, otherwise, $\Delta P_{PowerClass} = 0$ dB.

$P\text{-}MPRR_c$ is the allowed maximum output power reduction for a) ensuring compliance with applicable electromagnetic energy absorption requirements and addressing unwanted emissions/self defense requirements in case of simultaneous transmissions on multiple RAT(s) for scenarios not in scope of 3GPP RAN specifications;

b) ensuring compliance with applicable electromagnetic energy absorption requirements in case of proximity detection is used to address such requirements that require a lower maximum output power.

The configured maximum output power $P_{CMAX,c,NR}$(q) in slot q for the configured NR carrier can be determined by the UE based on the following Equation 8.

$$P_{CMAX\_L,c,NR}(q) \leq P_{CMAX,c,NR}(q) \leq P_{CMAX\_H,c,NR}(q) \quad \text{[Equation 8]}$$

In Equation 8, $P_{CMAX\_L,c,NR}$ (q) is a lower limit for the configured maximum output power $P_{CMAX,c,NR}$ (q) in a scheduling unit q for NR. $P_{CMAX\_H,c,E\text{-}UTRA}$ (p) a higher limit for the configured maximum output power $P_{CMAX,c,E\text{-}UTRA}$ (p) in a scheduling unit p for NR. In detail, $P_{CMAX\_L,c,NR}$ and $P_{CMAX\_H,c,NR}$ are specified as the following Equation 9.

$$P_{CMAX\_L,cNR} = \text{MIN}\{P_{EMAX,c} - \Delta T_{C,c}, (P_{PowerClass} - \Delta P_{PowerClass}) - \text{MAX}(MPR_c + A\text{-}MPR_c + \Delta T_{IB,c} + \Delta T_{C,c} + \Delta T_{RxSRS}, P\text{-}MPR_c)\}$$

$$P_{CMAX\_H,cNR} = \text{MIN}\{P_{EMAX,c}, P_{PowerClass} - \Delta P_{PowerClass}\} \quad \text{[Equation 9]}$$

$P_{EMAX,c}$ is Maximum allowed UE output power signaled by higher layers for serving cell c for NR. The $P_{EMAX,c}$ is given by IE P-Max for serving cell c. The IE P-Max is defined as the following Table 13.

TABLE 13

| -- ASN1START | |
|---|---|
| -- TAG-P-MAX-START | |
| P-Max ::= | INTEGER (−30..33) |
| -- TAG-P-MAX-STOP | |
| -- ASN1STOP | |

$P_{PowerClass}$ is the maximum UE power without taking into account the tolerance.

$\Delta P_{PowerClass} = 3$ dB for a power class 2 capable UE operating in Band n41, n77, n78 and n79, when P-max of 23 dBm or lower is indicated; or when the field of UE capability maxUplinkDutyCycle is absent and the percentage of uplink symbols transmitted in a certain evaluation period is larger than 50%; or when the field of UE capability maxUplinkDutyCycle is not absent and the percentage of uplink symbols transmitted in a certain evaluation period is larger than maxUplinkDutyCycle (The exact evaluation period is no less than one radio frame); or if P-Max is not indicated in the cell, $\Delta P_{PowerClass} = 0$ dB;

$\Delta T_{IB,c}$ is the additional tolerance for serving cell c. Value of $\Delta T_{IB,c}$ is predetermined based on number of bands used for EN-DC operation and which bands are included for EN-DC operation.

$MPR_c$ is a maximum power reduction for serving cell c in NR and A-$MPR_c$ is an additional maximum power reduction for serving cell c in NR.

$\Delta T_{RxSRS}$ is 3 dB and is applied when UE transmits Sounding Reference Signal (SRS) to the antenna port that is designated as Rx port. For other SRS transmissions $\Delta T_{RxSRS}$ is zero P-$MPR_c$ is the allowed maximum output power reduction for a) ensuring compliance with applicable electromagnetic energy absorption requirements and addressing unwanted emissions/self defense requirements in case of simultaneous transmissions on multiple RAT(s) for scenarios not in scope of 3GPP RAN specifications;

b) ensuring compliance with applicable electromagnetic energy absorption requirements in case of proximity detection is used to address such requirements that require a lower maximum output power.

$\Delta T_{C\_NR,c}$ is Allowed operating band edge transmission power relaxation for serving cell c. $\Delta T_{C\_NR,c}$=1.5 dB when NOTE 2 (for band n41, refers to the transmission bandwidths confined within $F_{UL\_low}$ and $F_{UL\_low}$+4 MHz or $F_{UL\_high}$−4 MHz and $F_{UL\_high}$, the maximum output power requirement is relaxed by reducing the lower tolerance limit by 1.5 dB) applies for a serving cell c. Otherwise, $\Delta T_{C\_NR,c}$=0 dB.

When E-UTRA uplink transmission of an UL scheduling unit p overlap with another NR uplink transmission of an UL scheduling unit q, then for $P_{CMAX}$ (p,q) evaluation, the UE take the scheduling unit p (subframe p) of E-UTRA as a reference for determining a total transmission power.

The total transmission power includes a total UE configured maximum output power $P_{CMAX}$ (p,q). The total UE configured maximum output power $P_{CMAX}$ (p,q) in a scheduling unit (TTI, sTTI, subframe) p for E-UTRA of CG 1 and a scheduling unit (slot) q for NR of CG 2 that overlap in time may be determined by the UE based on the following Equation 11 for both synchronous and asynchronous operation.

$$P_{CMAX\_L}(p,q) \leq P_{CMAX}(p,q) \leq P_{CMAX\_H}(p,q) \quad \text{[Equation 10]}$$

In Equation 10, $P_{CMAX\_L}$ (p,q) is a lower limit for the UE configured maximum output power $P_{CMAX}$ (p,q) and $P_{CMAX\_H}$ (p,q) is a higher limit for the UE configured maximum output power $P_{CMAX}$ (p,q).

The UE determines $P_{CMAX\_L}$ (p,q) based on a lower limit for transmission power of E-UTRA uplink signal transmitted on the scheduling unit p, and a lower limit a lower limit for transmission power of the NR uplink signal transmitted on the scheduling unit q, and a maximum transmission power of the UE. Also, The UE determines $P_{CMAX\_H}$ (p,q) based on a higher limit for transmission power of the E-UTRA uplink signal transmitted on the scheduling unit p, a higher limit for transmission power of the NR uplink signal transmitted on the scheduling unit q, and a maximum transmission power of the UE. For example, the UE may determine $P_{CMAX\_L}$ (p,q) and $P_{CMAX\_H}$ (p,q) based on Equation 11.

$$P_{CMAX\_L}(p,q) = \text{MIN}\{10 \log_{10}[p_{CMAX\_L,c(1),1}(p) + p_{CMAX\_L,c(2),2}(q)], P_{PowerClass}\}$$

$$P_{CMAX\_H}(p,q) = \text{MIN}\{10 \log_{10}[p_{CMAX\_H,c(1),1}(p) + p_{CMAX\_H,c(2),2}(q)], P_{PowerClass}\} \quad \text{[Equation 11]}$$

In Equation 11, $p_{CMAX\_L,c(i),i}$ and $p_{CMAX\_H,c(i),i}$ are $P_{CMAX\_L,c(i),i}$ (p) and $P_{CMAX\_H,c(i),i}$ (p) of Equation 5 expressed in linear scale. $P_{PowerClass}$ is the total maximum output power. For example, if c(1) is for E-UTRA and c(2) is for NR, the UE determines $p_{CMAX\_L,c(1),1}$ (p) based on $P_{CMAX\_L,c,E\text{-}UTRA}$ (p) of Equation 6 and the UE determines $p_{CMAX\_L,c(2),2}$ (q) based on $P_{CMAX\_L,c,NR}$ (q) of Equation 8. Also, the UE determines $p_{CMAX\_H,c(1),1}$ (p) based on $P_{CMAX\_H,c,E\text{-}UTRA}$ (p) of Equation 6 and the UE determines $p_{CMAX\_H,c(2),2}$ (q) based on $P_{CMAX\_H,c,NR}$ (q) of Equation 8.

When E-UTRA uplink signal and NR uplink signal overlap in time, the UE determines a total transmission power for E-UTRA uplink signal and NR uplink signal based on scheduling unit pairs which overlap in time during time duration of the reference subframe p. For example, the scheduling unit pairs include a a scheduling pair (p,q), a scheduling pair (p,q+1), up to a scheduling pair (p,q+n). Hereinafter, n is an integer including 0 and positive integer. Where the scheduling pair (p, q+n) corresponds to the reference scheduling unit p (E-UTRA subframe p) and a scheduling unit q+n (NR slot q+n) which is the last NR slot overlap in time with the E-UTRA subframe p.

The total transmission power includes a measured total maximum output power $P_{UMAX}$. To determine the measured total maximum output power $P_{UMAX}$, all individual applicable overlapping scheduling pairs are considered. In detail, The UE determines the measured total maximum output power $P_{UMAX}$ based on $P'_{CMAX\_L}$ and $P'_{CMAX\_H}$. $P'_{CMAX\_L}$ and $P'_{CMAX\_H}$ are determined by the UE based on the following Equation 12.

$$P'_{CMAX\_L} = \text{MIN}\{P_{CMAX\_L}(p,q), P_{CMAX\_L}(p,q+1), \ldots, P_{CMAX\_L}(p,q+n)\}$$

$$P'_{CMAX\_H} = \text{MAX}\{P_{CMAX\_H}(p,q), P_{CMAX\_H}(p,q+1), \ldots, P_{CMAX\_H}(p,q+n)\} \quad \text{[Equation 12]}$$

In Equation 13, $P'_{CMAX\_L}$ is a minimum value among lower limits for the total transmission power of the scheduling pairs which overlap in time during time duration of the reference subframe p. $P'_{CMAX\_H}$ is a maximum value among higher limits for the total transmission power of the scheduling pairs which overlap in time during time duration of the reference subframe p. $P_{CMAX\_L}$ (p,q) up to $P_{CMAX\_L}$ (p,q+n) and $P_{CMAX\_H}$ (p,q) up $P_{CMAX\_H}$ (p,q+n) are the applicable limits for each overlapping scheduling unit pairs (p,q), (p, q+1), up to applicable (p, q+n), where scheduling unit q+n of NR is informed by last UL grant known before or simultaneously with LTE UL grant informing the reference subframe p according to NR subcarrier spacing.

The measured total maximum output power $P_{UMAX}$ over both CGs/RATs, measured over the transmission reference unit duration may be defined as the following Equation 13.

$$P_{UMAX} = 10 \log_{10}[p_{UMAX,c(1),1} + p_{UMAX,c(2),2}], \quad \text{[Equation 13]}$$

In Equation 13, $p_{UMAX,c(i),i}$ denotes the measured output power of serving cell c(i) of CGi expressed in linear scale. For example, if c(1) is for E-UTRA and c(2) is for NR, $p_{UMAX,c(1),1}$ is a measured output power of E-UTRA serving cell c(1) and $p_{UMAX,c(2),2}$ is a measured output power of NR serving cell c(2).

The UE determines the measured total configured maximum output power $P_{UMAX}$ based on the following Equation 14.

$$P'_{CMAX\_L} - T_{LOW}(P'_{CMAX\_L}) \leq P_{UMAX} \leq P'_{CMAX\_H} + T_{HIGH}(P'_{CMAX\_H}) \quad \text{[Equation 14]}$$

In Equation 14, $T_{LOW}$ is a tolerance value for the lower limit of the measured total configured maximum output power $P_{UMAX}$ and $T_{HIGH}$ is a tolerance value for the higher limit of the measured total configured maximum output power $P_{UMAX}$. $T_{LOW}$ and $T_{HIGH}$ are determined by the UE based on the following Table 14.

TABLE 14

| $P_{CMAX}$ (dBm) | Tolerance $T_{LOW}$ ($P_{CMAX\_L}$) (dB) | Tolerance $T_{HIGH}$ ($P_{CMAX\_H}$) (dB) |
| --- | --- | --- |
| $P_{CMAX}$ = 23 | 3.0 | 2.0 |
| 22 ≤ $P_{CMAX}$ < 23 | 5.0 | 2.0 |
| 21 ≤ $P_{CMAX}$ < 22 | 5.0 | 3.0 |
| 20 ≤ $P_{CMAX}$ < 21 | 6.0 | 4.0 |
| 16 ≤ $P_{CMAX}$ < 20 | 5.0 | |
| −40 ≤ $P_{CMAX}$ < 11 | 7.0 | |

In Table 14, $T_{LOW}$ and $T_{HIGH}$ correspond to $P_{CMAX}$ are shown. For example, is a tolerance value for the higher limit of the measured total configured maximum output power $P_{UMAX}$. $T_{LOW}$ ($P'_{CMAX\_L}$) and $T_{HIGH}$ ($P'_{CMAX\_H}$) are determined based on corresponding value of $P'_{CMAX\_L}$ and $P'_{CMAX\_H}$. For example, if $P'_{CMAX\_L}$ is 20 dBm, $T_{LOW}$ ($P'_{CMAX\_L}$) is determined to be 6.0 dB and if $P'_{CMAX\_H}$ is 22 dBm, $T_{HIGH}$ ($P'_{CMAX\_H}$) is determined to be 2.0 dB. Thus, the UE may determine the lower limit of the measured total configured maximum output power $P_{UMAX}$ to be 20 dBm −6.0 dB=14 dBm. Also, the UE may determine the higher limit of the measured total configured maximum output power $P_{UMAX}$ to be 22 dBm+2.0 dB=24 dBm. Therefore, the measured total configured maximum output power $P_{UMAX}$ is determined to satisfy 14 dBm≤$P_{UMAX}$≤24 dBm.

If the EN-DC UE is not supporting dynamic power sharing (UE Type 2), and both E-UTRA and NR uplinks are operating in the FR1 and the total UE configured maximum output power $P_{CMAX}$ (p,q) is exceed the EN-DC UE power class which is a maximum output power for EN-DC operation, then only E-UTRA uplink transmission is allowed for EN-DC UE. Where the EN-DC UE power class is predetermined value based on E-UTRA operating bands and NR operating bands.

As explained above, the present description provides that the UE performing EN-DC operation determines the total transmission power based on both the E-UTRA uplink signal and the NR uplink signal which overlap in time. Especially, the UE takes scheduling units (subframe) of E-UTRA as a reference for total transmission power. Based on the reference scheduling units, the UE determines scheduling units of the the E-UTRA uplink signal and the NR uplink signal which overlap in time. Thus, the UE determines the total transmission power precisely, so the UE prevents uplink transmission exceeding maximum permissible exposure (MPE) or specific absorption rate (SAR).

Figure 13:
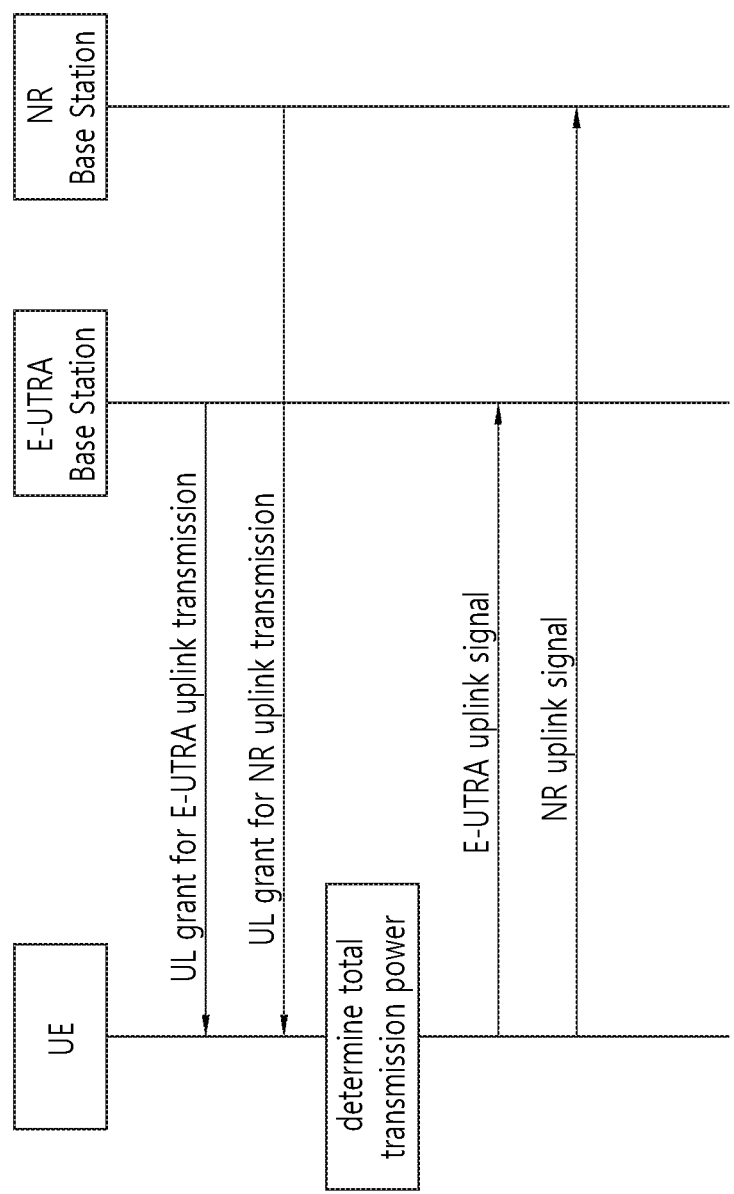
FIG. 13 illustrates an operation of UE according to embodiments of the present disclosure.

FIG. 13 illustrates an operation of UE according to embodiments of the present disclosure.

As shown in FIG. 13, the E-UTRA base station transmits a UL grant for E-UTRA uplink transmission to the UE through PDCCH and the NR base station transmits a UL grant for NR uplink transmission to the UE through PDCCH.

Then, the UE determines a total transmission power for E-UTRA uplink signal and NR uplink signal, when the E-UTRA uplink signal and the NR uplink signal overlap in time.

In detail, the UE determines the total transmission power to satisfy a condition including on $P_{CMAX\_L}$ and $P_{CMAX\_H}$. $P_{CMAX\_L}$ is a lower limit for the total transmission power and $P_{CMAX\_H}$ is a higher limit for the total transmission power.

When the E-UTRA uplink signal is transmitted on a scheduling unit p, when the NR uplink signal is transmitted on a scheduling unit q, the UE take the scheduling unit p as a reference for the determination.

The UE determines $P_{CMAX\_L}$ based on scheduling unit pairs which include a scheduling pair (p,q), a scheduling pair (p,q+1), up to a scheduling pair (p,q+n). The UE determines the $P_{CMAX\_H}$ is determined based on scheduling unit pairs which include a scheduling pair (p,q), a scheduling pair (p,q+1), up to a scheduling pair (p,q+n). The q+n is related with a last scheduling unit q+n of the NR uplink signal which overlaps with the scheduling unit p of the E-UTRA uplink signal. The UE determines the last scheduling unit q+n based on the UL grant for E-UTRA uplink transmission and the UL grant for NR uplink transmission.

Then, the UE transmits the E-UTRA uplink signal and the NR uplink signal based on the determined total transmission power. In detail, the UE transmits the E-UTRA uplink signal to E-UTRA base station and transmits the NR uplink signal to NR base station.

Figure 14:
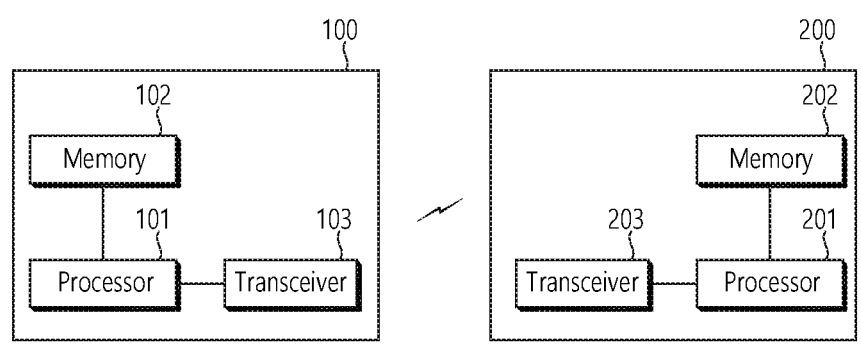
FIG. 14 illustrates a block diagram illustrating a wireless communication system according to embodiments of the present invention.

FIG. 14 illustrates a block diagram illustrating a wireless communication system according to embodiments of the present invention.

A base station 200 includes a processor 201, a memory 202, and a transceiver 203. The memory 202 is connected to the processor 201 to store various information for driving the processor 201. The transceiver 203 is connected to the processor 201 to transmit and/receive a wireless signal. The processor 201 implements a suggested function, procedure, and/or method. An operation of the base station 200 according to the above embodiment may be implemented by processor 201.

A wireless device 100 includes a processor 101, a memory 102, and an transceiver 103. The memory 102 is connected to the processor 101 to store various information for driving the processor 101. The transceiver 103 is connected to the processor 101 to transmit and/receive a wireless signal. The processor 101 implements a suggested function, procedure, and/or method. An operation of the wireless 100 according to the above embodiment may be implemented by processor 201.

Figure 15:
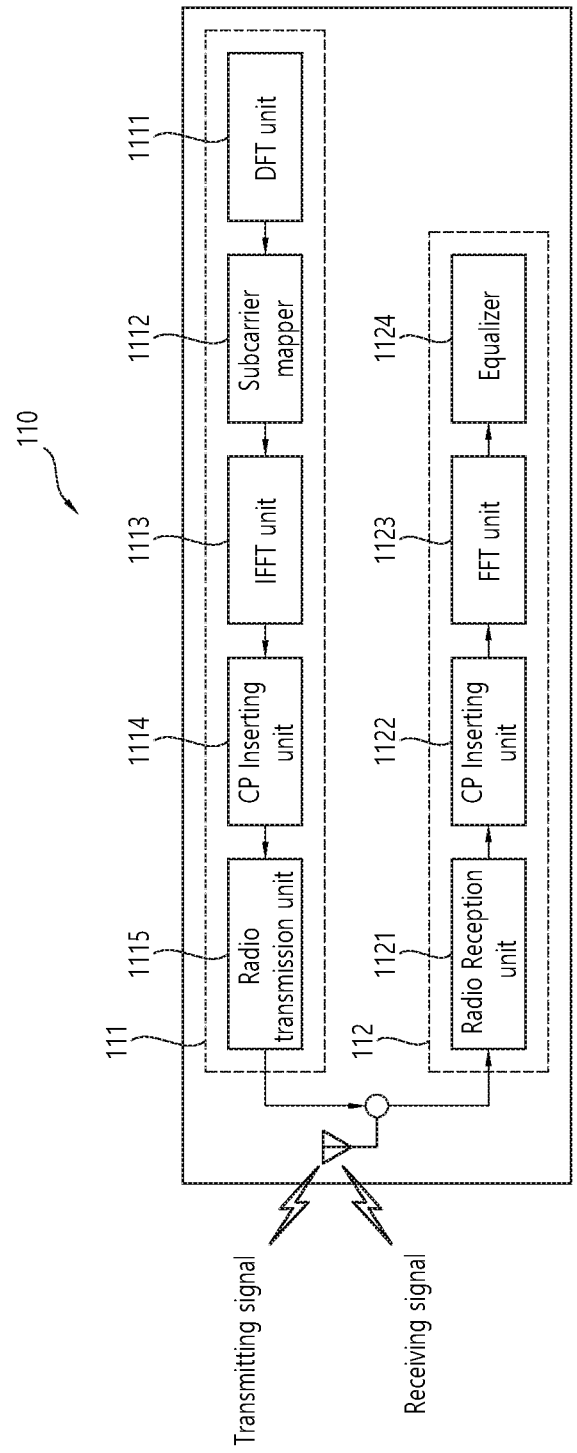
FIG. 15 is a detailed block diagram of a transceiver included in the wireless device shown in FIG. 14.

FIG. 15 is a detailed block diagram of a transceiver included in the wireless device shown in FIG. 14.

Referring to FIG. 7, the transceiver (110) includes a transmitter (111) and a receiver (112). The transmitter (111) includes a Discrete Fourier Transform (DFT) unit (1111), a subcarrier mapper (1112), an Inverse Fast Fourier Transform (IFFT) unit (1113), a CP inserter (1114), a radio transmitter (1115). The transmitter (111) may further include a modulator. Also, for example, the transmitter (111) may further include a scramble unit (not shown), a modulation mapper (not shown), a layer mapper (not shown), and a layer permutator (not shown), and these blocks may be positioned before the DFT unit (1111). More specifically, in order to prevent an increase in the peak-to-average power ratio (PAPR), the transmitter (111) allows information to pass through the DFT unit (1111) beforehand prior to mapping a signal to a subcarrier. After performing subcarrier mapping, a signal that is spread (or precoded, in the same sense) by the DFT unit (1111) through the subcarrier mapper (1112), a signal within a time axis is generated (or created) after the processed signal passes through the Inverse Fast Fourier Transform (IFFT) unit (1113).

The DFT unit (1111) performs DFT on the inputted symbols, thereby outputting complex number symbols (complex-valued symbols). For example, if Ntx symbols are inputted (wherein Ntx is an integer), a DFT size is equal to Ntx. The DFT unit (1111) may also be referred to as a transform precoder. The subcarrier mapper (1112) maps the complex number symbols to each subcarrier of the frequency domain. The complex number symbols may be mapped to resource elements corresponding to resource blocks being assigned for data transmission. The subcarrier mapper (1112) may also be referred to as a resource element mapper. The IFFT unit (1113) performs IFFT on the inputted symbols, thereby outputting a baseband signal for data, which correspond to a time domain signal. The CP inserter (1114) duplicates (or copies) an end part of the baseband signal for the data and inserts the duplicated part to a front part of the baseband signal for the data. By performing CP insertion, Inter-Symbol Interference (ISI) and Inter-Carrier Interference (ICI) may be prevented, thereby allowing orthogonality to be maintained even in a multi-path channel.

Meanwhile, the receiver (112) includes a radio receiver (1121), a CP remover (1122), a Fast Fourier Transform (FFT) unit (1123), and an equalizer (1124). The radio receiver (1121), the CP remover (1122), and the FFT unit (1123) of the receiver (112) respectively perform the inverse functions of the radio transmitter (1115), the CP inserter (1114), and the IFFT unit (1113) of the transmitter (111). The receiver (112) may further include a demodulator.

The processor may include an application-specific integrated circuit (ASIC), another chipset, a logical circuit and/or a data processing device. The memory may include a read-only memory (ROM), a random access memory (RAM), a flash memory, a memory card, a storage medium, and/or another storage device. The RF unit may include a baseband circuit for processing a wireless signal. When embodiments are implemented in software, the above described scheme may be implemented as a module for performing the above described function (process, function, etc.). The module is stored in the memory and may be executed by the processor. The memory may exit inside or outside the processor and may be connected to the processor in various known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for determining transmission power for uplink signal, the method performed by a wireless communication device and comprising:
    determining total power of Evolved Universal Terrestrial Radio Access (E-UTRA) uplink signal and New Radio access (NR) uplink signal based on a lower limit for the total power, a tolerance value for the lower limit, a upper limit for the total power and a tolerance value for the upper limit;
    controlling a transceiver of the wireless communication device to transmit the E-UTRA uplink signal and the NR uplink signal based on the determined total power,
    wherein the tolerance value for the lower limit corresponds to:
    5.0 dB,; 22 dBm≤maximum transmission power<23 dBm
    5.0 dB,; 21 dBm≤the maximum transmission power<22 dBm
    6.0 dB,; 20 dBm≤the maximum transmission power<21 dBm
    5.0 dB,; 16 dBm≤the maximum transmission power<20 dBm
    6.0 dB,; 11 dBm≤the maximum transmission power<16 dBm
    7.0 dB,; −40 dBm≤the maximum transmission power<11 dBm, and
    wherein the tolerance value for the upper limit corresponds to:
    2.0 dB,; 22 dBm≤the maximum transmission power<23 dBm
    3.0 dB,; 21 dBm≤the maximum transmission power<22 dBm
    4.0 dB,; 20 dBm≤the maximum transmission power<21 dBm
    5.0 dB,; 16 dBm≤the maximum transmission power<20 dBm
    6.0 dB,; 11 dBm≤the maximum transmission power<16 dBm
    7.0 dB,; −40 dBm≤the maximum transmission power<11 dBm.

2. The method of claim 1,
    wherein the tolerance value for the lower limit corresponds to:
    3.0 dB,; the maximum transmission power is equal to 23 dBm, and
    wherein the tolerance value for the upper limit corresponds to:
    2.0 dB,; the maximum transmission power is equal to 23 dBm.

3. The method of claim 1,
    wherein the lower limit for the total power is PCMAX_L and the upper limit for the total power is PCMAX_H.

4. The method of claim 1,
    wherein an E-UTRA uplink scheduling unit p is taken as a reference for the total power, based on that the E-UTRA uplink scheduling unit p overlaps with a NR uplink scheduling unit q.

5. The method of claim 4,
    wherein the lower limit for the total power is based on uplink scheduling unit pairs which include a uplink scheduling pair (p,q), a uplink scheduling pair (p,q+1), up to a uplink scheduling pair (p,q+n),
    wherein the upper limit for the total power is based on the scheduling unit pairs which include the uplink scheduling pair (p,q), the uplink scheduling pair (p,q+1), up to the uplink scheduling pair (p,q+n), and
    wherein q+n is related with a last NR uplink scheduling unit q+n which overlaps with the E-UTRA uplink scheduling unit p.

6. The method of claim 5,
    wherein the lower limit for the total power is based on lower limits for maximum transmission power of each of the uplink scheduling unit pairs which include the uplink scheduling pair (p,q), the uplink scheduling pair (p,q+1), up to the uplink scheduling pair (p,q+n), and
    wherein the upper limit for the total power is based on upper limits for maximum transmission power of each of the uplink scheduling unit pairs which include the uplink scheduling pair (p,q), the uplink scheduling pair (p,q+1), up to the uplink scheduling pair (p,q+n).

7. The method of claim 1,
    wherein the E-UTRA uplink signal is transmitted to E-UTRA serving cell, and the NR uplink signal is transmitted to NR serving cell.

8. A wireless communication device for determining transmission power for uplink signal, the UE comprising,
    a transceiver; and
    a processor operatively coupled to the transceiver, the processor is configured to:

determine total power of Evolved Universal Terrestrial Radio Access (E-UTRA) uplink signal and New Radio access (NR) uplink signal based on a lower limit for the total power, a tolerance value for the lower limit, a upper limit for the total power and a tolerance value for the upper limit; and control the transceiver to transmit the E-UTRA uplink signal and the NR uplink signal based on the determined total power, wherein the tolerance value for the lower limit corresponds to:

5.0 dB,; 22 dBm≤maximum transmission power<23 dBm 5.0 dB,; 21 dBm≤the maximum transmission power<22 dBm 6.0 dB,; 20 dBm≤the maximum transmission power<21 dBm 5.0 dB,; 16 dBm≤the maximum transmission power<20 dBm 6.0 dB,; 11 dBm≤the maximum transmission power<16 dBm 7.0 dB,; −40 dBm≤the maximum transmission power<11 dBm, and wherein the tolerance value for the upper limit corresponds to:

2.0 dB,; 22 dBm≤the maximum transmission power<23 dBm 3.0 dB,; 21 dBm≤the maximum transmission power<22 dBm 4.0 dB,; 20 dBm≤the maximum transmission power<21 dBm 5.0 dB,; 16 dBm≤the maximum transmission power<20 dBm 6.0 dB,; 11 dBm≤the maximum transmission power<16 dBm 7.0 dB,; −40 dBm≤the maximum transmission power<11 dBm.

9. The wireless communication device of claim 8, wherein the tolerance value for the lower limit corresponds to:

3.0 dB,; the maximum transmission power is equal to 23 dBm, and wherein the tolerance value for the upper limit corresponds to:

2.0 dB,; the maximum transmission power is equal to 23 dBm.

10. The wireless communication device of claim 8, wherein the lower limit for the total power is PCMAX_L and the upper limit for the total power is PCMAX_H.

11. The wireless communication device of claim 8, wherein an E-UTRA uplink scheduling unit p is taken as a reference for the total power, based on that the E-UTRA uplink scheduling unit p overlaps with a NR uplink scheduling unit q.

12. The wireless communication device of claim 11, wherein the lower limit for the total power is based on uplink scheduling unit pairs which include a uplink scheduling pair (p,q), a uplink scheduling pair (p,q+1), up to a uplink scheduling pair (p,q+n), wherein the upper limit for the total power is based on the scheduling unit pairs which include the uplink scheduling pair (p,q), the uplink scheduling pair (p,q+1), up to the uplink scheduling pair (p,q+n), and wherein q+n is related with a last NR uplink scheduling unit q+n which overlaps with the E-UTRA uplink scheduling unit p.

13. The wireless communication device of claim 12, wherein the lower limit for the total power is based on lower limits for maximum transmission power of each of the uplink scheduling unit pairs which include the uplink scheduling pair (p,q), the uplink scheduling pair (p,q+1), up to the uplink scheduling pair (p,q+n), and wherein the upper limit for the total power is based on upper limits for maximum transmission power of each of the uplink scheduling unit pairs which include the uplink scheduling pair (p,q), the uplink scheduling pair (p,q+1), up to the uplink scheduling pair (p,q+n).

14. The wireless communication device of claim 8, wherein the E-UTRA uplink signal is transmitted to E-UTRA serving cell, and the NR uplink signal is transmitted to NR serving cell.

* * * * *